United States Patent
Bandera et al.

(10) Patent No.: US 10,326,348 B2
(45) Date of Patent: Jun. 18, 2019

(54) MULTI-DEGREE OF FREEDOM ELECTROMAGNETIC MACHINE

(71) Applicant: HONEYWELL INTERNATIONAL INC., Morris Plains, NJ (US)

(72) Inventors: Pablo Bandera, Avondale, AZ (US); Hans Roth, Phoenix, AZ (US); Mark A. Carson, Chandler, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 445 days.

(21) Appl. No.: 15/165,587

(22) Filed: May 26, 2016

(65) Prior Publication Data
US 2017/0012492 A1     Jan. 12, 2017

Related U.S. Application Data

(63) Continuation-in-part of application No. 14/792,799, filed on Jul. 7, 2015, now Pat. No. 9,893,574.

(51) Int. Cl.
*H02K 7/116*     (2006.01)
*H02K 41/03*     (2006.01)

(52) U.S. Cl.
CPC ....... *H02K 41/031* (2013.01); *H02K 2201/18* (2013.01)

(58) Field of Classification Search
CPC .................................................. H02K 2201/18
See application file for complete search history.

(56) References Cited

U.S. PATENT DOCUMENTS

| 3,105,657 A | 10/1963 | Mueller et al. |
| 3,178,600 A | 4/1965 | Bers |
| 3,295,379 A | 1/1967 | Jensen et al. |
| 4,611,863 A | 9/1986 | Isely |
| 4,855,838 A | 8/1989 | Jones et al. |

(Continued)

FOREIGN PATENT DOCUMENTS

| CN | 101858354 A | 10/2010 |
| CN | 102975868 A | 3/2013 |

(Continued)

OTHER PUBLICATIONS

USPTO Office Action for U.S. Appl. No. 14/792,799 dated Jun. 30, 2017.

(Continued)

*Primary Examiner* — Dang D Le
(74) *Attorney, Agent, or Firm* — Lorenz & Kopf, LLP

(57) ABSTRACT

A multi-degree-of-freedom electromagnetic machine that may be operated as a motor, a generator, or a motor-generator, includes a first structure and a second structure. The first structure comprises a first conductor, a second conductor, and a third conductor, each of which follows a different trajectory. The first, second, and third conductors together form a general shape of a surface. The second structure is disposed adjacent to the first structure and includes a magnet that emanates a magnetic field. The magnet has at least one of its magnetic poles facing the surface. A Lorentz force affects relative movement between the first structure and the second structure when the magnetic field that emanates from the at least one magnetic pole interacts with electrical currents within any of the electrical conductors.

20 Claims, 28 Drawing Sheets

(56) References Cited

U.S. PATENT DOCUMENTS

| | | | |
|---|---|---|---|
| 4,961,352 A | 10/1990 | Downer et al. | |
| 5,204,573 A | 4/1993 | Bederson et al. | |
| 5,413,010 A * | 5/1995 | Nakanishi | B01F 15/00435 |
| | | | 310/156.38 |
| 6,906,441 B2 | 6/2005 | Mendenhall | |
| 7,235,906 B2 | 6/2007 | Carroll et al. | |
| 7,614,804 B2 | 11/2009 | Kim | |
| 7,630,620 B2 | 12/2009 | Benson et al. | |
| 7,675,208 B2 | 3/2010 | Bandera | |
| 7,812,507 B2 | 10/2010 | Takahashi et al. | |
| 7,960,896 B2 | 6/2011 | Takahashi et al. | |
| 7,969,375 B2 | 6/2011 | Blalock | |
| 8,459,383 B1 * | 6/2013 | Burget | B60B 19/003 |
| | | | 180/7.1 |
| 8,600,600 B2 | 12/2013 | Jung | |
| 2004/0021785 A1 | 2/2004 | Pshtissky et al. | |
| 2008/0073989 A1 | 3/2008 | Bandera | |
| 2011/0064403 A1 | 3/2011 | Nakano et al. | |
| 2012/0139744 A1 | 6/2012 | Ridgway | |
| 2014/0191626 A1 | 7/2014 | Hollis, Jr. et al. | |
| 2014/0209751 A1 | 7/2014 | Stagmer | |

FOREIGN PATENT DOCUMENTS

| | | |
|---|---|---|
| CN | 104753285 A | 7/2015 |
| DE | 10019023 A1 | 10/2001 |
| GB | 802776 | 10/1958 |
| GB | 2330457 A | 4/1999 |
| JP | S60204252 A | 10/1985 |
| WO | 9919971 A1 | 4/1999 |
| WO | 2004001941 A1 | 12/2003 |

OTHER PUBLICATIONS

Miles, A.R.; Spherical Electric Motors, IEEE Potentials, Oct. 1990.

Bederson, B.B. et al; A Miniature Pan-Tilt Actuator: The Spherical Pointing Motor; IEEE Transactions on Robotics and Automation, vol. 10, No. 3, Jun. 1994.

Bolognesi, P. et al.; Electromagnetic Actuators Featuring Multiple Degrees of Freedom: a Survey; ICEM 2004 Conference, Krakow (Poland) Sep. 5-8, 2004.

Wang, J. et al.; Multi-Degree-of-Freedom Spherical Permanent Magnet Motors; Proceedings of the 2001 IEEE International Conference on Robotics & Automation Seoul, Korea, May 2-26 2001.

Bederson, B.B. et al.; Two Miniature Pan-Tilt Devices; Proceeding of the 1992 IEEE International Conference on Robotics and Automation Nice, France—May 1998.

Steele, A.B.; Design of a Lorentz, Slotless Self-Bearing Motor for Space Applications; Dec. 13, 2002.

Choi, Y, et al.; Halbach Magnetic Circuit for Voice Coil Motor in Hard Disk Drives; Journal of Magnetics 15(3) 143-147, 2010.

Extended EP Search Report for Application No. 17169156.1 dated Apr. 26, 2018.

Partial European Search Report for Application No. 17169156.1-1806 dated Oct. 11, 2017.

Extended EP Search Report for Application No. 161751411-1809 dated Dec. 1, 2016.

EP Examination for Application No. 16 175 141.7-1201 dated Jul. 23, 2018.

* cited by examiner

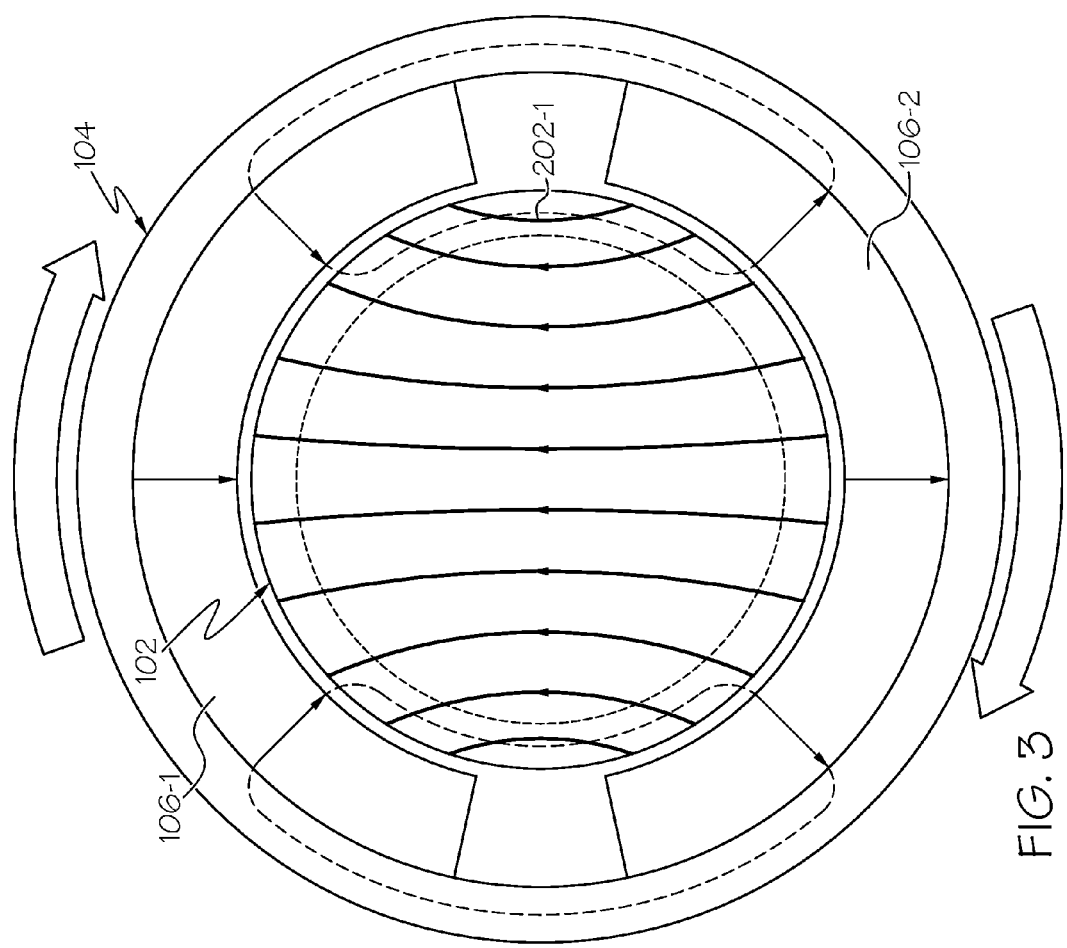

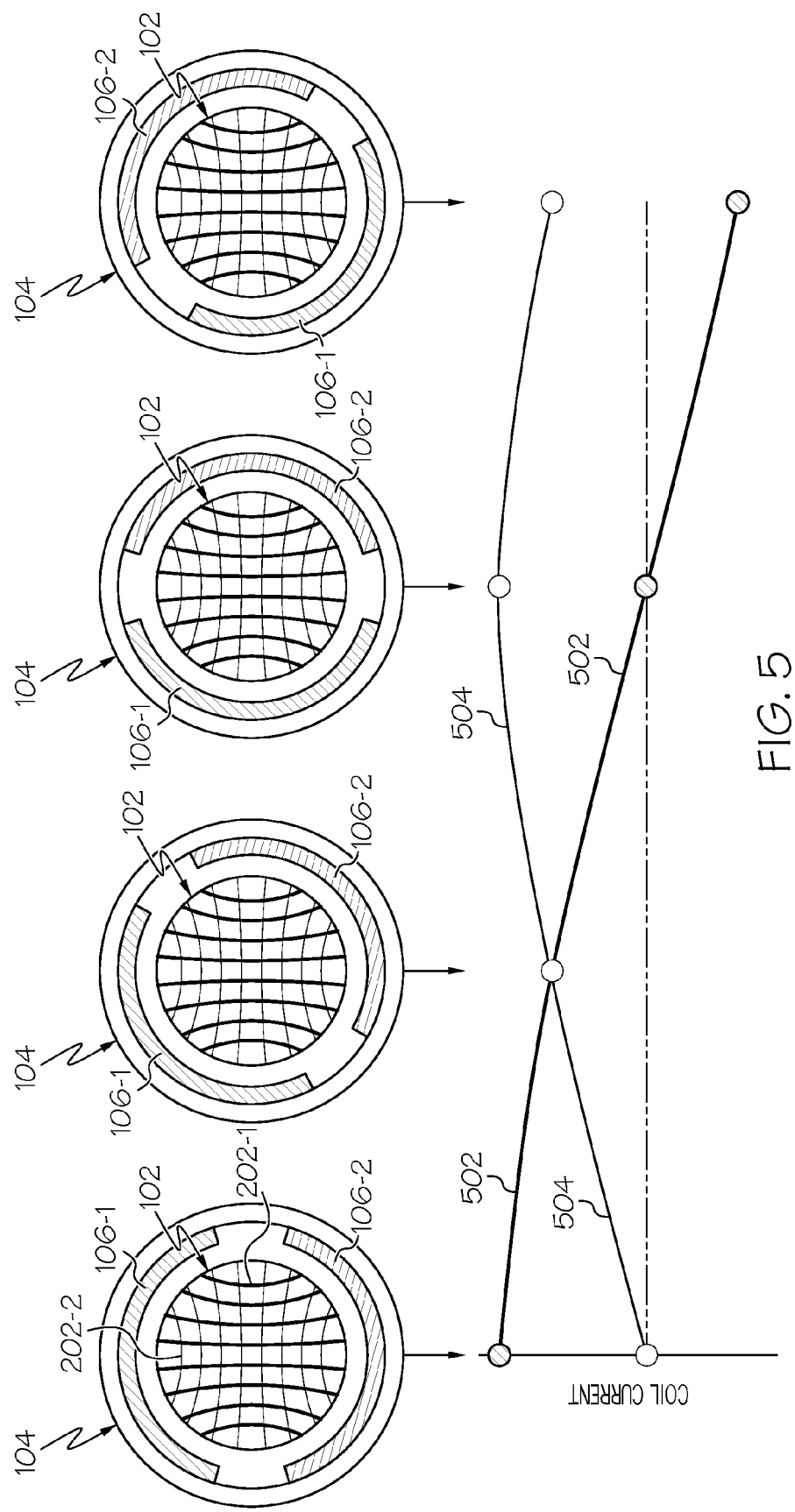

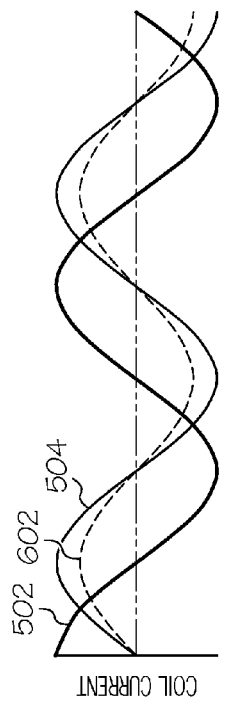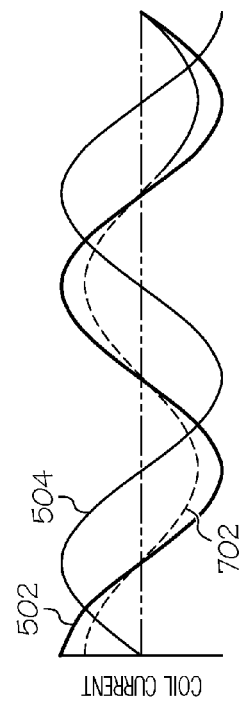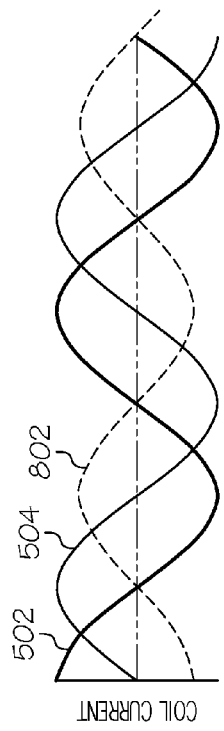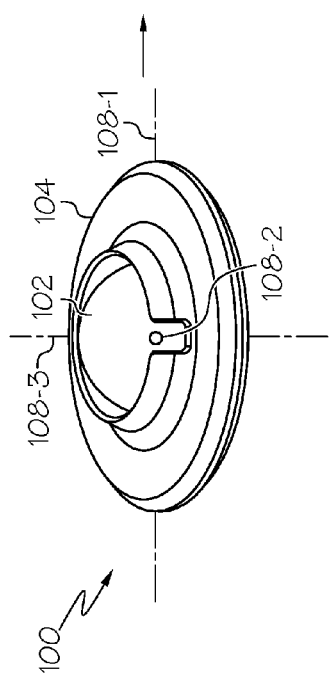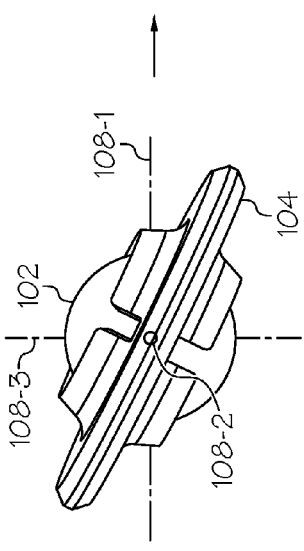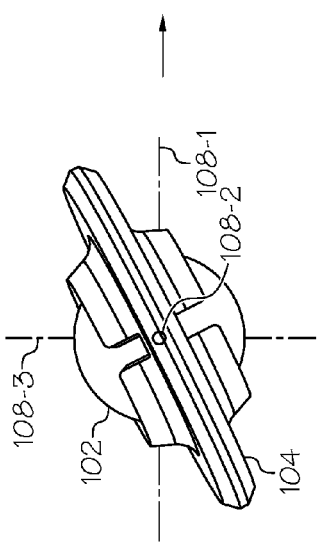
FIG. 6  FIG. 7  FIG. 8

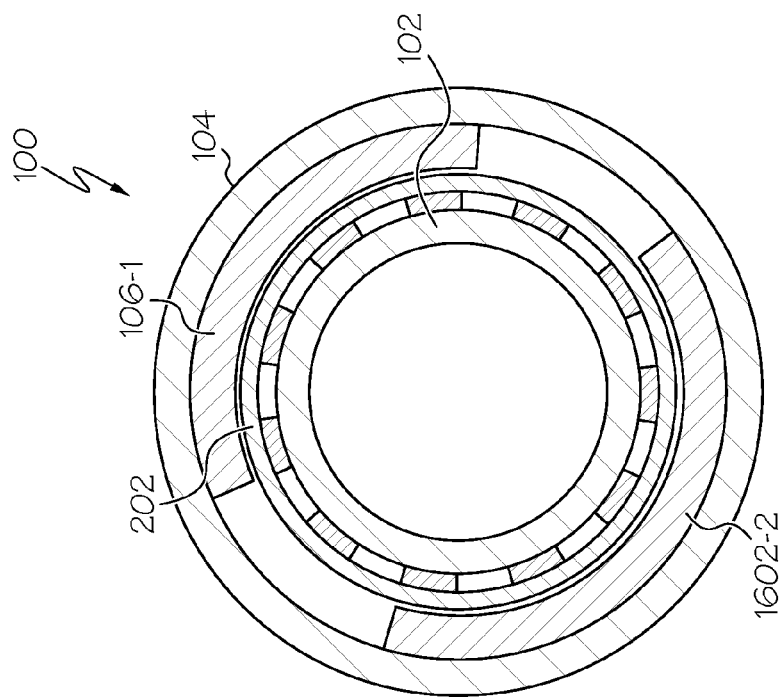
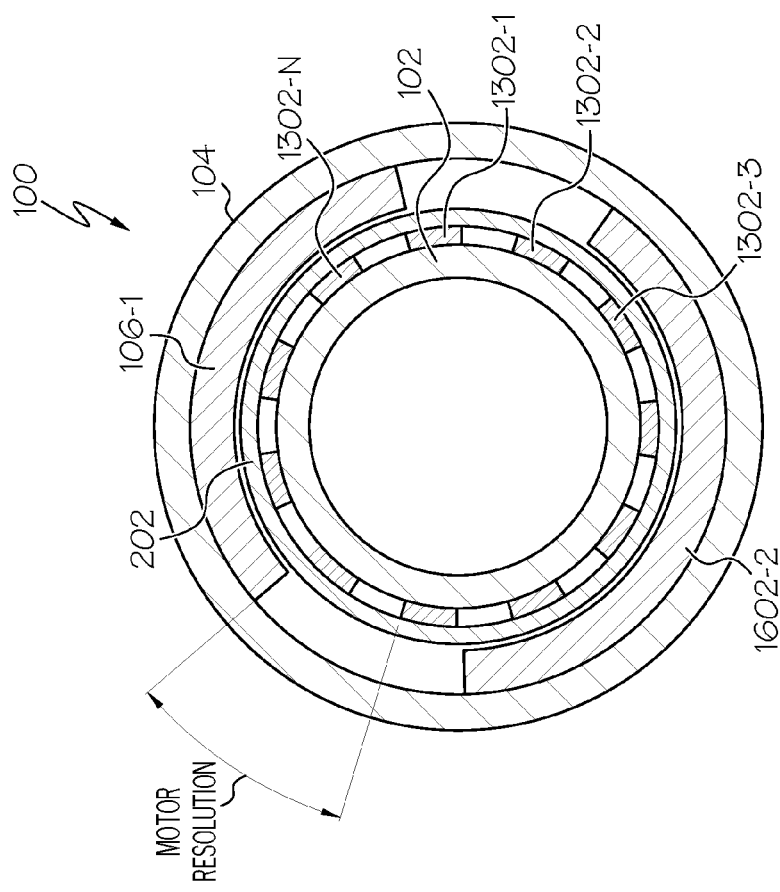
FIG. 13B
FIG. 13A

MULTI-DEGREE OF FREEDOM ELECTROMAGNETIC MACHINE

CROSS-REFERENCE TO RELATED APPLICATION

This application is a continuation-in-part (CIP) of U.S. patent application Ser. No. 14/792,799, filed Jul. 7, 2015.

TECHNICAL FIELD

The present invention generally relates to electromagnetic machines, and more particularly relates to a multi-degree of freedom electromagnetic machine, such as a motor and/or generator.

BACKGROUND

It is generally known that currently available motion control systems that are designed to move an object in more than one degree of freedom (DoF) include a separate motor or actuator for each DoF. More specifically, at least two motors or actuators are needed to implement 2-DoF motion, at least three motors or actuators are needed to implement 3-DoF motion, and so on. Consequently, mechanisms that involve more than one DoF tend to be somewhat large and cumbersome, and therefore inefficient.

While electronics and sensor technologies have gotten significantly smaller in recent years, mechanical motion technology has not kept up. This is why motion systems such as pan/tilt mechanisms are typically not used on smaller platforms, such as mini- or micro-UAVs (unmanned air vehicles) and micro-satellites. Robotics systems, which depend on multi-DoF motion control, must simply put up with the inherent inefficiencies of current motion-on-motion systems.

One solution to the above-described problems is disclosed in U.S. Pat. No. 7,675,208, entitled "Global Pointing Actuator." The actuator disclosed therein includes a spherical stator with a "latitude coil" and a "longitude coil" wound thereon. This actuator, however, also exhibits certain drawbacks. For example, the longitude coil is physically difficult to wind. This is because the windings are not parallel and converge, or "bunch up," at the poles of the spherical stator. This adds to the overall cost and size, and reduces coil efficiency. Another drawback is that a separate centering torque is (e.g., springs or a magnetic detent) required to implement open-loop position control of the armature.

Hence, there is a need for a multi-degree of freedom electromechanical machine that is relatively smaller, less cumbersome, and more efficient than known devices and/or does not include coils that are difficult to wind and/or does not rely on a separate centering torque to implement open-loop position control. The present invention addresses at least these needs.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In an embodiment, a multi-degree-of-freedom electromagnetic machine that may be operated as a motor, a generator, or a motor-generator, includes a first structure and a second structure. The first structure comprises a first conductor, a second conductor, and a third conductor. The first conductor follows a first general trajectory, the second conductor follows a second general trajectory that is different from the first general trajectory, and the third conductor follows a third general trajectory that is different from the first and second general trajectories. The first, second, and third conductors together form a general shape of a surface. The second structure is disposed adjacent to the first structure and includes a magnet that emanates a magnetic field. The magnet has at least one of its magnetic poles facing the surface. A Lorentz force affects relative movement between the first structure and the second structure when the magnetic field that emanates from the at least one magnetic pole interacts with electrical currents within any of the electrical conductors.

Furthermore, other desirable features and characteristics of the multi-degree of freedom electromechanical machine will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein:

FIG. 3 depicts a simplified cross section view of a portion of a multi-degree of freedom spherical actuator, illustrating how a torque is generated;

FIG. 5 depicts the manner in which the multi-degree of freedom spherical actuator may be operated as a motor;

FIGS. 6-8 depict the multi-degree of freedom spherical actuator with the armature spinning and disposed in various armature positions;

FIGS. 13A and 13B depict another embodiment of the multi-degree of freedom spherical actuator;

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

In this regard, it is noted that the multi-degree of freedom spherical actuator disclosed herein is, for ease of explanation and illustration, generally described as operating as a motor. Persons of ordinary skill in the art will appreciate, however, that the disclosed actuator may also be operated as a generator by moving the armature with an external force and inducing currents in the conductors, or as a sensor (e.g., a rate sensor from generated back EMF), or numerous other devices. It should also be noted that although FIGS. 2-5 depict some of the conductors as curved, this is done merely to convey a three-dimensional (3D) spherical shape. It should additionally be noted that in the following description the first and second structures may, in some embodiments, be the below-described stator and armature, respectively. This, however, is not always the case. For example, in some embodiments, the first and second structures may be the armature and stator, respectively. In addition, the terms coils and windings that are used in describing some of the embodiments as useful examples of trajectories typically used in spherical arrangements.

Figure 1:
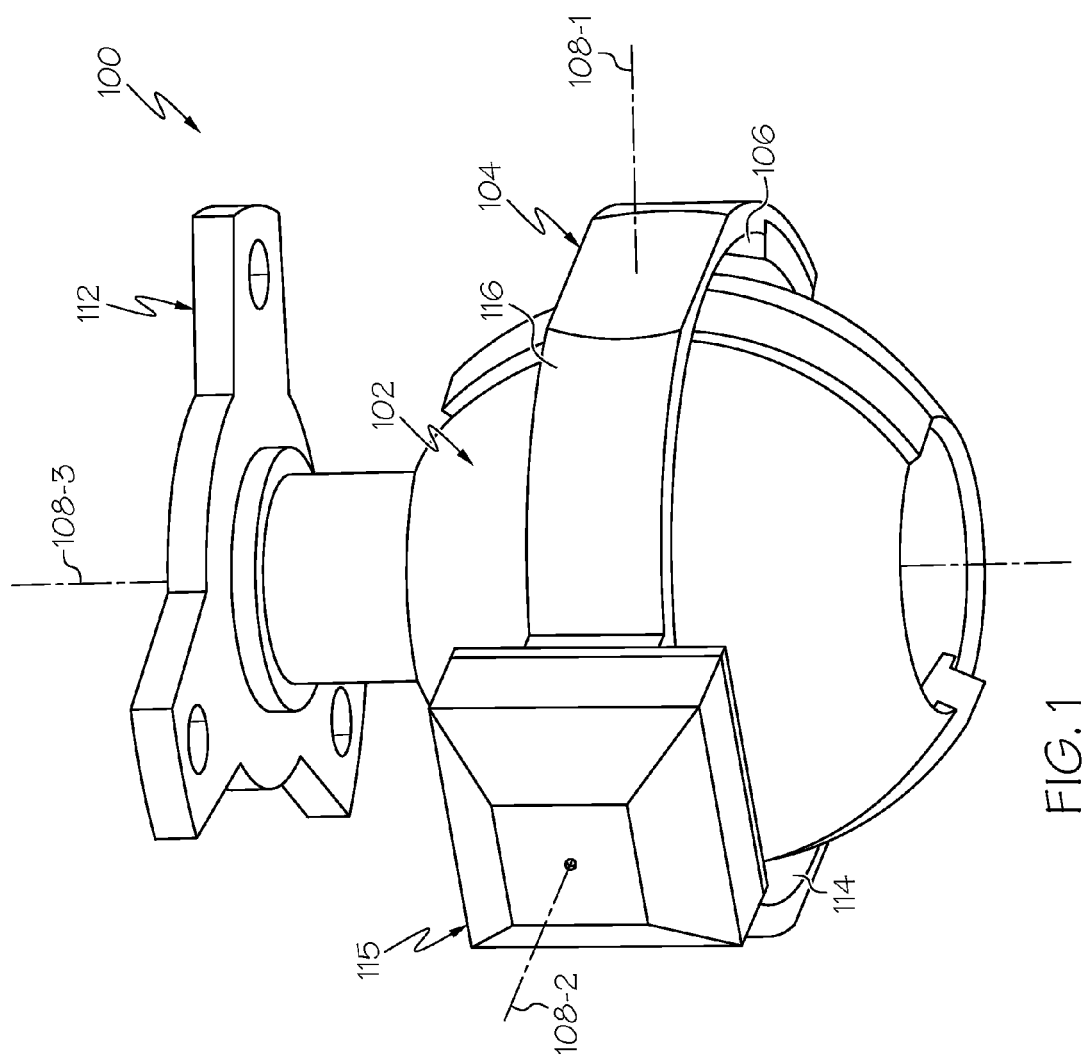
FIG. 1 depicts a plan view of one example embodiment of a multi-degree of freedom spherical actuator.

With reference first to FIG. 1, a plan view of one embodiment of a multi-degree of freedom spherical actuator 100 is depicted, and includes a spherical stator 102, an armature 104, and a plurality of magnets 106. The spherical stator 102, as this term implies, is spherically shaped, and thus has three perpendicularly disposed axes of symmetry 108—a first axis of symmetry 108-1, a second axis of symmetry 108-2, and a third axis of symmetry 108-3. The spherical stator 102 preferably comprises a magnetically permeable material, such as iron or an iron alloy, and preferably implemented as a hollow sphere. Preferably, the spherical stator 102 is fixedly mounted via, for example, a mount structure 112, to another non-depicted structure. The non-depicted structure may be, for example, a wall, a ceiling, a ship or aircraft bulkhead, or a ship or aircraft hull, just to name a few.

The armature 104 is spaced apart from, and surrounds at least a portion of, the spherical stator 102. The armature 104, which includes an inner surface 114 and an outer surface 116, is mounted such that it is movable relative to the spherical stator 102. Preferably, the armature 104 is mounted such that it is movable, relative to the spherical stator 102, about two or three of the axes of symmetry 108. As a result, a device 115, such as a sensor, a laser, or other suitable device, which may be mounted on the outer surface 116 of the armature 104, may be moved to a desired position. How this movement is accomplished will be described further below. Like the spherical stator 102, the armature 104 also preferably comprises a magnetically permeable material such as, for example, iron or an iron alloy.

Figure 36:
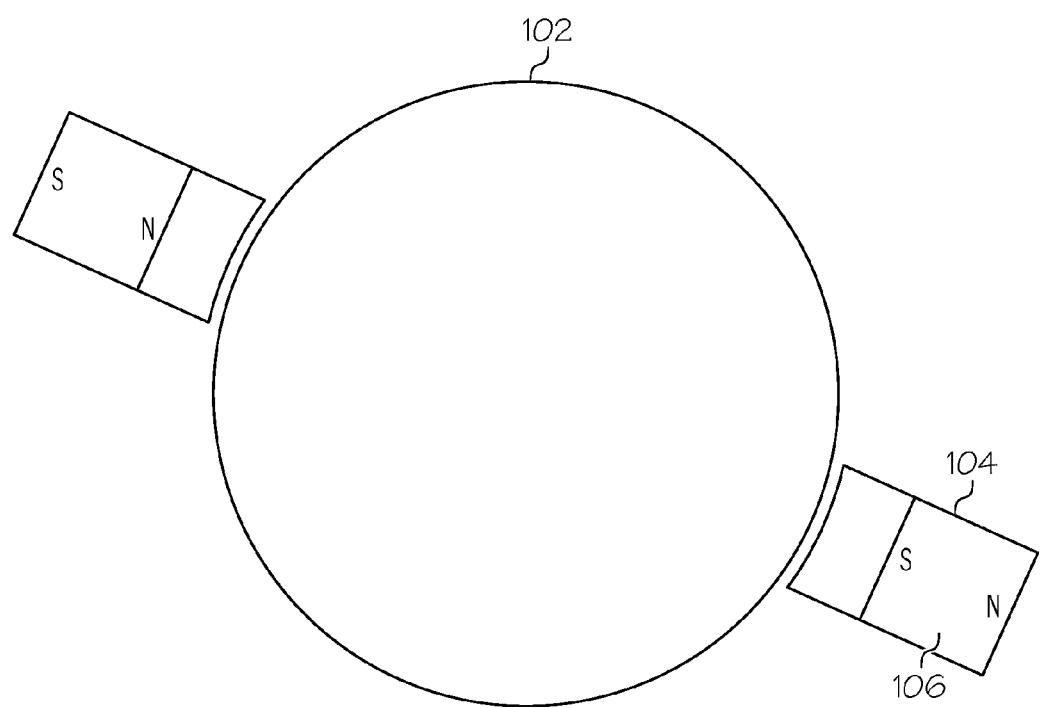
FIGS. 36-38 depicts alternative arrangements and configurations of portions of the machines described herein.
Figure 37:
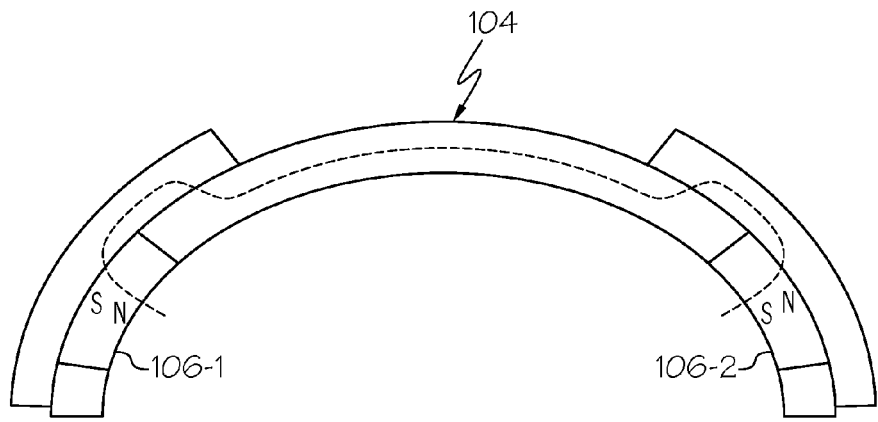
Figure 38:
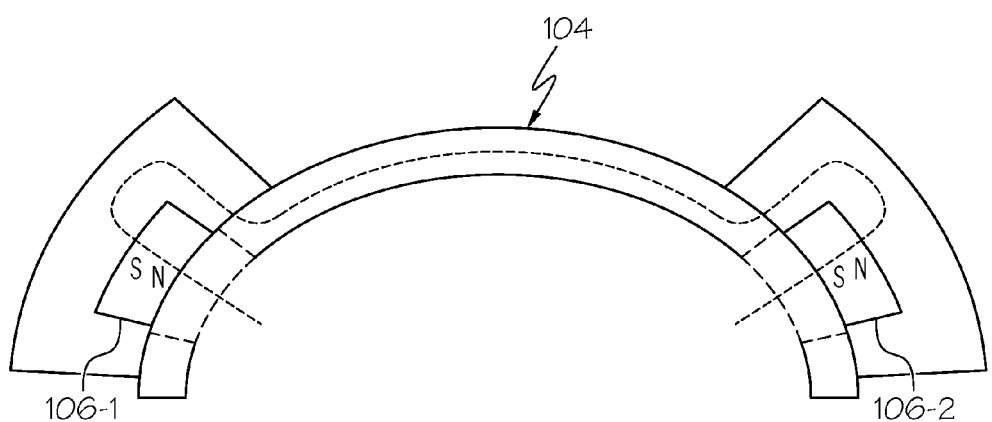

The magnets 106 (only one visible in FIG. 1) are coupled to, and extend inwardly from, the inner surface 116 of the armature 104, and are spaced apart from the spherical stator 102. In the depicted embodiment, as shown more clearly in FIG. 2, the spherical actuator 100 includes a plurality of magnets 106. In the depicted embodiment, the spherical actuator 100 includes a pair of magnets—a first magnet 106-1 and a second magnet 106-2. It will be appreciated, however, that in other embodiments more or less than two magnets 106 may be used. It will additionally be appreciated that the magnets 106 may be variously shaped and dimensioned, and may be variously disposed. For example, in the depicted embodiment the magnets 106 are generally arc-shaped, but in other embodiments the magnets 106 may be semi-spherically shaped, or any one of numerous other shapes if needed or desired. It will additionally be appreciated that the arc length of the magnets 106 may be varied, and that the magnets 106 may be permanent magnets or, if needed or desired, electromagnets. Moreover, while the portion of the magnets 106 that face the stator 102 are preferably, for efficiency, contoured similar to the armature 102, these portions need not be so contoured. In an embodiment depicted in FIG. 36, for example, the one or more magnets 106 may be disposed on or mounted on a magnetically permeable structure (e.g., the armature 104) that, preferably (though not necessarily), is at least partially contoured similar to the stator 102. And, as FIGS. 37 and 38 depict, the one or more magnets 106 may be formed as part of a portion of the armature 104 (FIG. 37) or formed separately but surrounded by at least a portion of the armature 104 (FIG. 38). It is noted that the dotted lines in FIGS. 37 and 38 represent an exemplary flux path. It is further noted that the embodiment depicted in FIG. 38 may optionally include holes or slots 3802 (depicted in phantom) to force the flux in the depicted path. These holes or slots 3802 may optionally be filled with a suitable material, such as epoxy.

Regardless of the shape and dimensions, however, the magnets 106 are preferably arranged such that the polarity of the first magnet 106-1 relative to the spherical stator 102 is opposite to the polarity of the second magnet 106-2. For example, in the embodiment depicted in FIG. 2, the north pole (N) of the first magnet 106-1 is disposed closer to the spherical stator 102, whereas the south pole (S) of the second magnet 106-2 is disposed closer to the spherical stator 102.

Figure 2:
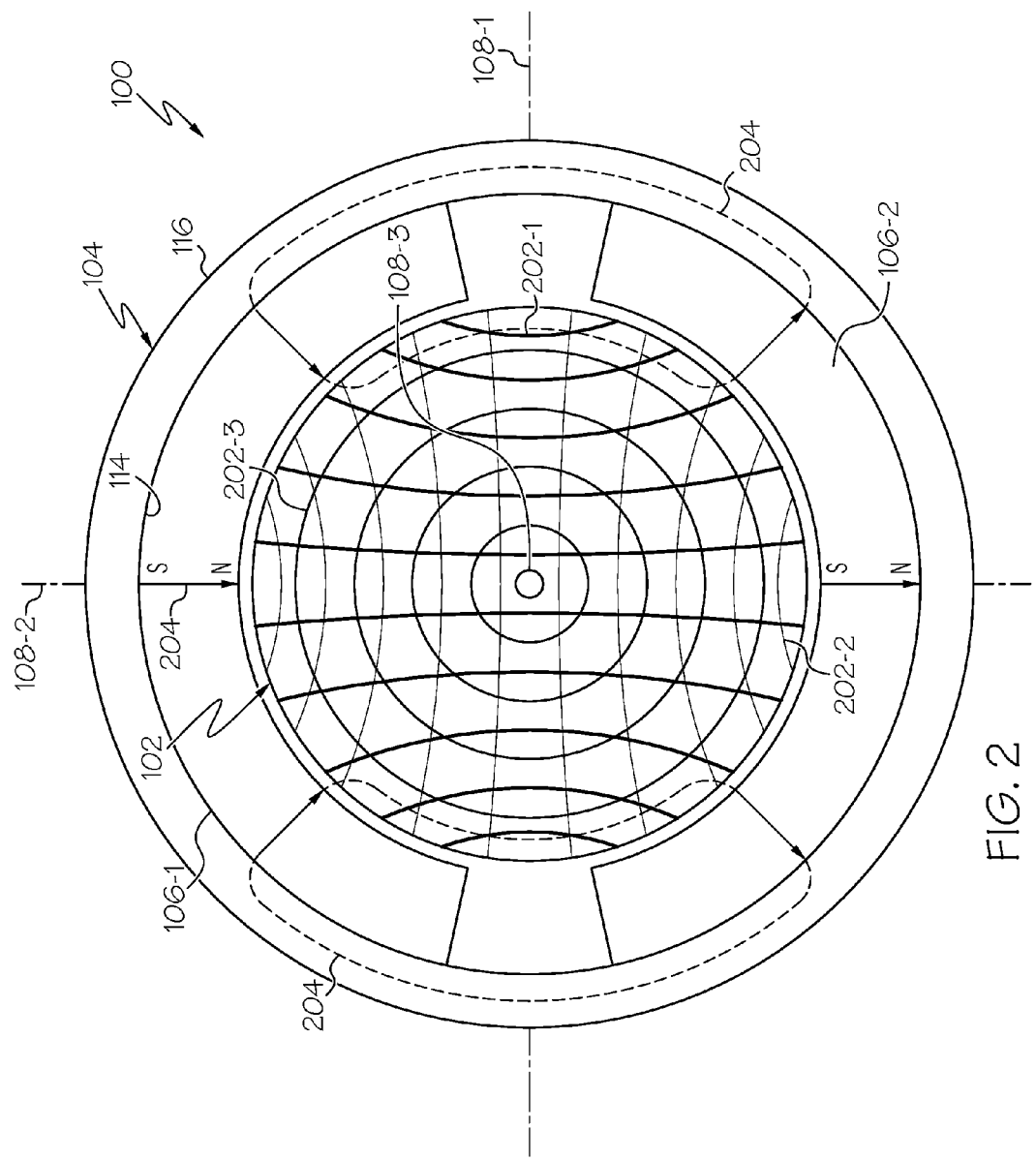
FIG. 2 depicts a simplified cross section view of a portion of a multi-degree of freedom spherical actuator.

As FIG. 2 also depicts, the spherical stator 102 has a plurality of coils 202 wound thereon. In the depicted embodiment, these include a first coil 202-1, a second coil 202-2, and a third coil 202-3. It will be appreciated, however, that in some embodiments the spherical actuator 102 may be implemented with only two coils instead of three. The first coil 202-1 is wound on the spherical stator 102 about the first axis of symmetry 108-1, the second coil 202-2 is wound on the spherical stator 102 about the second axis of symmetry 108-2, and the third coil 202-2, when included, is wound on the spherical stator 102 about the third axis of symmetry 202-3. It should be noted that a sphere has an infinite number of axes of symmetry. Thus, the first, second, and third axes of symmetry 108-1, 108-2, 108-3, could be any one of these axes of symmetry, so long as all three axes of symmetry are perpendicular to each other.

Before proceeding further, it is noted that the coils 202 may be wound manually with wires, or may be printed onto a flexible or spherical surface using known printing methods. Moreover, each coil 202 may have different characteristics. For example, the coils 202 may differ from each other in size, number of turns, and resistance, and may also be machined or formed as a solid piece, just to name a few characteristics. Doing so allows one to relatively easily and independently tailor each axis to have different performance characteristics, if needed or desired.

The configuration of the magnets 106 and coils 202 is such that magnetic flux 204 from travels from the first magnet 106-1 into the spherical stator 102 on one side and back out on the other side to the second magnet 106-2. The magnetic flux 204 also travels through the coils 202 on both sides of the spherical stator 102, and the magnetically permeable armature 104 provides the return path for the magnetic flux 204. As may be appreciated, when an electrical current is supplied to one or more of the coils 202, a Lorentz force is generated between the energized coil(s) 202 and the magnets 106, which in turn generates in a torque about one or more of the axes of symmetry 108. The direction of the generated torque, as may also by appreciated, is based on the direction of the current flow in the coil(s) 202.

Referring now to FIG. 3, an example of the torque that is generated when one of the coils 202 is energized will now be described. For clarity, and ease of illustration, only a single coil (e.g., the first coil 202-1) is depicted. As FIG. 3 depicts, when the first coil 202-1 is supplied with electrical current in the depicted direction, a torque is generated about the third axis of symmetry 108-3 in the clockwise direction (as viewed from the perspective of FIG. 3). It will be appreciated that reversing the direction of the current will generate a torque in the opposite (i.e., counterclockwise) direction. It will additionally be appreciated that the magnitude of the torque may be varied by varying the magnitude of the current supplied to the coil(s) 202.

Figure 4A:
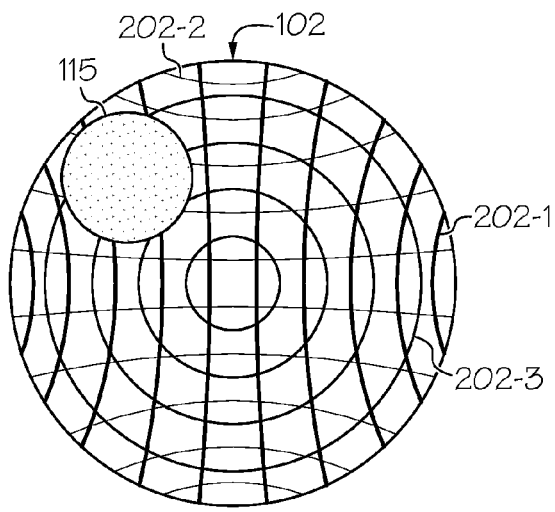
FIG. 4A-4C depict the multi-degree of freedom spherical actuator with the armature in different armature positions.
Figure 4B:
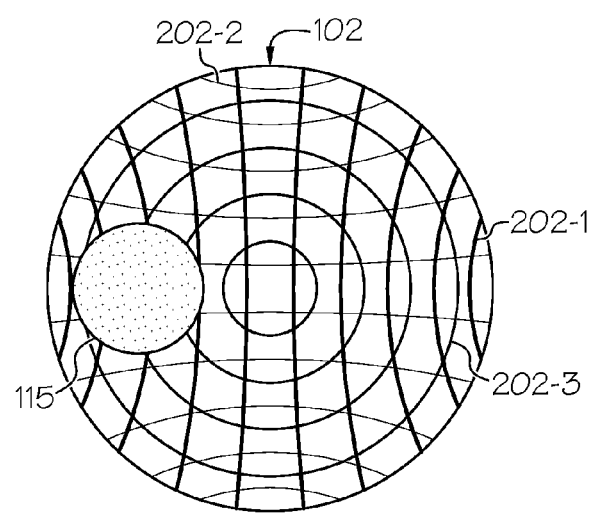
Figure 4C:
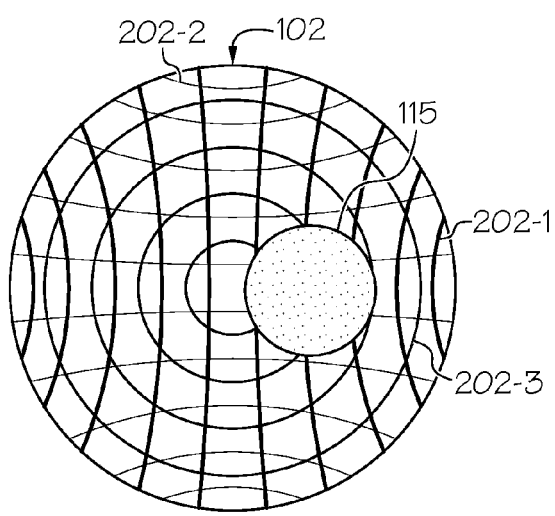

Because, in this example, the spherical stator 102 is fixedly mounted, the torque that is generated will cause the armature 104 to move to an armature position relative to the spherical stator 102. The armature position may thus be controlled by controlling the magnitudes and directions of the currents in the coils 202. The armature 104, and thus the sensor device 115, can be moved to and held in a desired armature position relative to the spherical stator 102. This capability is illustrated in FIGS. 4A-4C. In FIG. 4A, all of the coils 202 are energized with currents of the same magnitude and direction. In FIG. 4B, the first 202-1 and third 202-3 coils are energized with currents of the same magnitude and direction, and the second coil 202 is not energized. In FIG. 4C, the first coil 202-1 is energized with a current of a first magnitude and first direction, the second coil 202 is not energized, and the third coil 202-3 is energized with a current of a second magnitude and second direction, where the second magnitude is double the first magnitude, and the second direction is opposite the first direction.

The armature 104 can also (or instead) be made to continuously rotate about one of the axes of symmetry 108. This capability is illustrated in FIG. 5. In the depicted example, the armature 104 continuously rotates about the third axis of symmetry 108-3 by energizing the first coil 202-1 with a first alternating electrical current 502 and energizing the second coil 202-2 with a second alternating electrical current 504, where the first and second alternating currents 502, 504 are equal in amplitude and are 90-degrees out of phase. It will be appreciated that the armature 104 can be made to continuously rotate about the first or second axes of symmetry 108-1, 108-2 by controllably energizing, in a similar manner, the second and third coils 202-2, 202-3, or the first and third coils 202-1, 202-3, respectively. Moreover, while a relatively simple sinusoidal two-phase commutation technique is depicted and described herein, various other types of two-phase commutation techniques, such as block commutation, may also be used.

The spherical actuator 100 is also configured such that the armature 104 can be made to continuously rotate about one of the axes of symmetry 108 and simultaneously tilt to an armature position about one or both of the other axes of symmetry 108. This capability is illustrated in FIGS. 6-8. In particular, in each of FIGS. 6-8, the first and second coils 202-1, 202-2 are energized, as described above, to cause the armature 104 to be continuously rotated about the third axis of symmetry 108-3. In FIG. 6, however, the third coil 202-3 is energized with a third alternating current 602 that is in phase with the second alternating current 504. As a result, the armature 104 rotates, about the first axis of symmetry 108-1, to an armature position. In FIG. 7, the third coil 202-3 is energized with a third alternating current 702 that is in phase with the first alternating current 502. As a result, the armature 104 rotates, in a first direction about the second axis of symmetry 108-2, to an armature position. And in FIG. 8, the third coil 202-3 is energized with a third alternating current 802 that is out of phase with the second alternating current 504. As a result, the armature 104 rotates, in a second direction about the second axis of symmetry 108-2, to an armature position. As may be appreciated, the tilt angle of the armature 104 is controlled via the magnitude of the third alternating currents 602, 702, 802, and the tilt axis is controlled via the relative phase of the third alternating currents 602, 702, 802.

Figure 9:
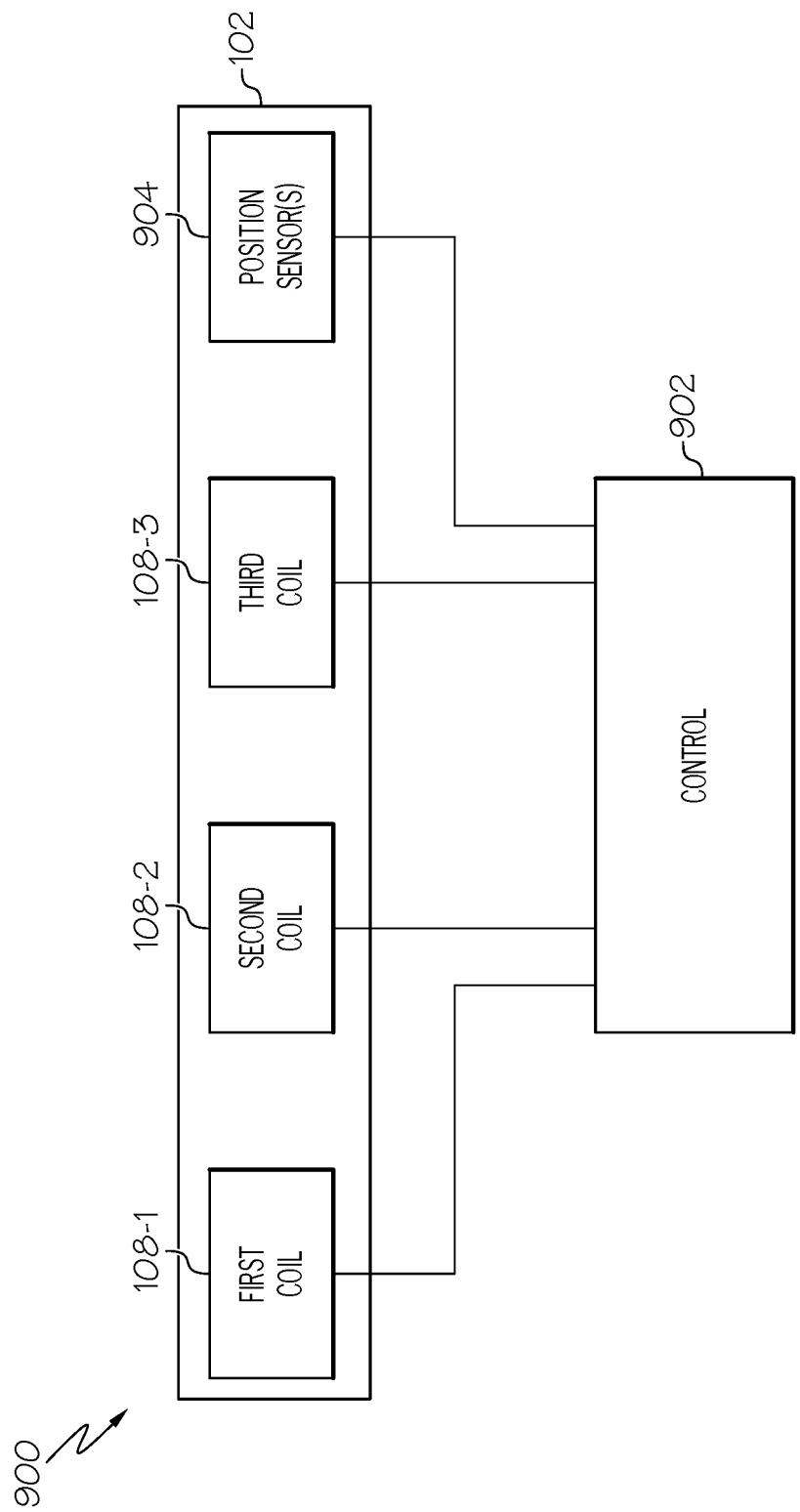
FIG. 9 depicts a functional block diagram of a multi-degree of freedom actuation control system.

Referring now to FIG. 9, a functional block diagram of a multi-degree of freedom actuation control system 900 that includes the multi-degree of freedom spherical actuator 100 of FIG. 1 is depicted. As FIG. 9 depicts, the system 900 includes a control 902 that is coupled to each of the first, second, and third coils 108. The control 902 is configured to control the current magnitudes and directions in each of the coils 108 to thereby control the armature position, and thus the position of the sensor device 115 (if included). The control 902 may be configured to implement this functionality using either open-loop control or closed-loop control. Open-loop control provides relatively lower cost, less complexity, relatively simple DC operation, and relatively lower size and weight. Closed-loop control provides higher accuracy and precision, higher bandwidth, and autonomous control. Various control techniques could be implemented in the control 902. Some non-limiting examples of suitable control techniques include PWM control and back EMF control.

If the control 902 implements closed-loop control, then the control system 900 additionally includes one or more position sensors 904. The number and type of position sensors 904 may vary. For example, the system 900 may include one or more sensors 904 to independently sense armature position along each axis of symmetry. Such sensors may be implemented using optical sensors, track balls, rotary sensors, or the like. In other embodiments, the sensor 904 may be implemented using an optical mask that is applied to the surface of the spherical stator 102, which can then be read by an optical sensor mounted on the inner surface 114 of the armature 104.

It will be appreciated that data and power may be transmitted to and from the coils 108 and position sensor(s) 904 (if included), using any one of numerous techniques. For example, data may be transmitted wirelessly, via flexible conductors, or via miniature slip rings, and power may be transmitted via flexible conductors, via miniature slip rings, or provided via a battery.

Figure 10:
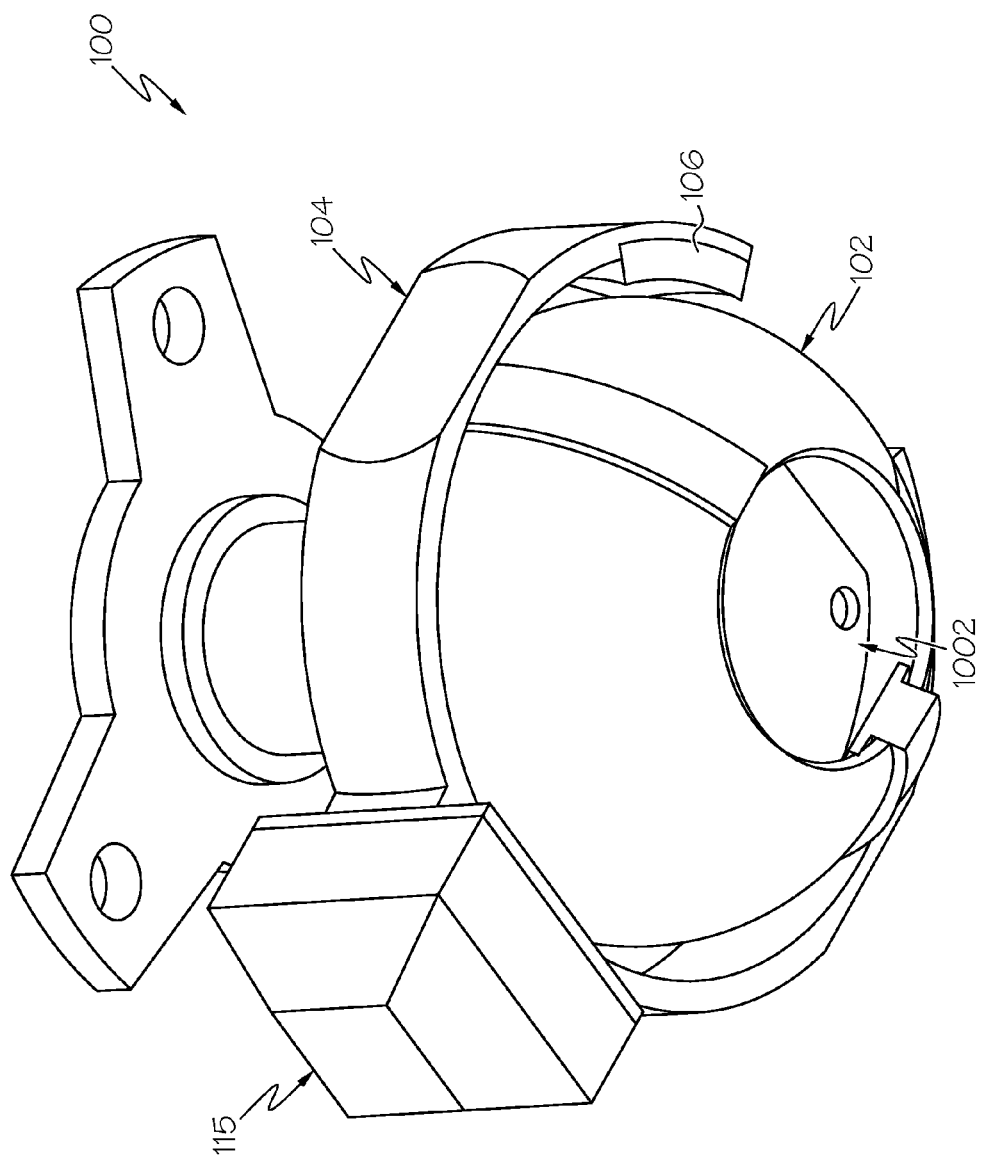
FIG. 10 depicts a plan view of the multi-degree of freedom spherical actuator with electronics mounted within the spherical stator.
Figure 11:
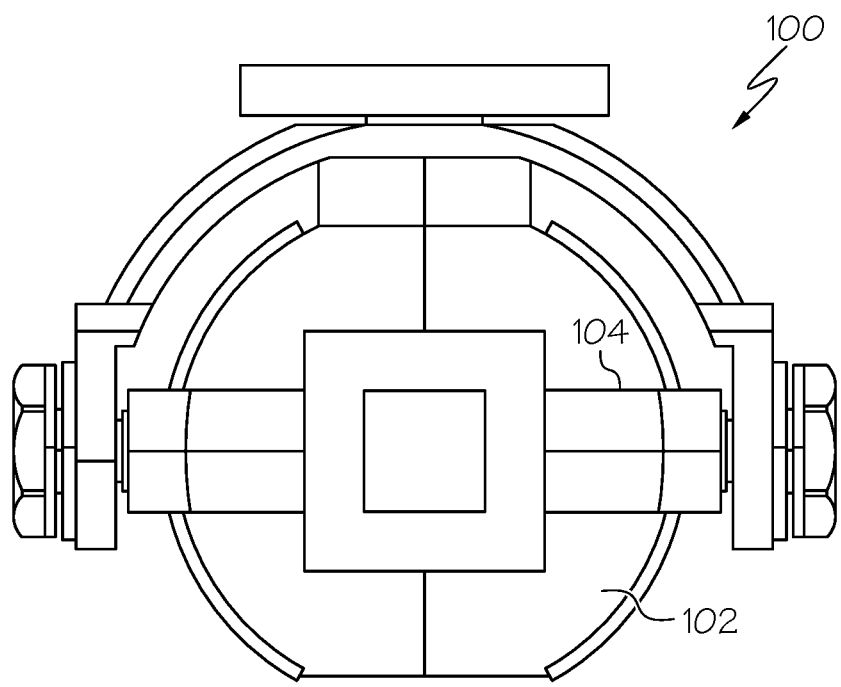
FIGS. 11 and 12, depict the multi-degree of freedom spherical actuator mounted in a gimbaled and un-gimbaled manner, respectively.
Figure 12:
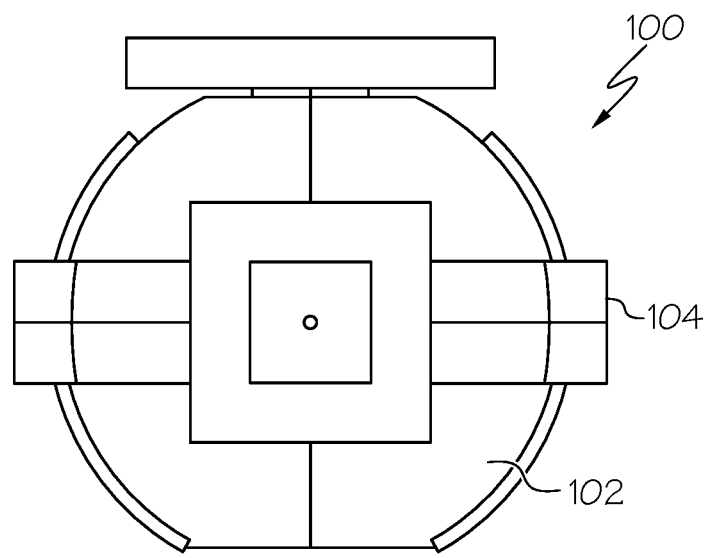

Because, as noted above, the spherical stator 102 is preferably a hollow sphere, the various electronics 1002 that comprise the control system 900 may, as depicted in FIG. 10, be mounted within the spherical stator 102. Moreover, the multi-degree of freedom spherical actuator 100 may be implemented in a gimbaled or an un-gimbaled configuration, depending upon the desired number of axes of free rotation of the armature 104. With the gimbaled configuration, an embodiment of which is depicted in FIG. 11, the armature 104 has two axes of free rotation, because the third is fixed. With the un-gimbaled configuration, an embodiment of which is depicted in FIG. 12, the armature has free rotation about all three axes of symmetry.

The multi-degree of freedom spherical actuator 100 may also be configured to provide a holding torque with no applied power, similar to a stepper motor. A simplified cross section view of one example embodiment of a multi-degree of freedom spherical actuator 100 that is configured to implement this stepper motor functionality is depicted in FIGS. 13A and 13B. As depicted therein, the multi-degree of freedom spherical actuator 100 is configured very similar to the previously described embodiments, and thus includes a spherical stator 102, an armature 104, a plurality of magnets 106, and a plurality of coils 202. One difference, however, is that that spherical stator 102 includes a plurality of spaced-apart protrusions 1302 (e.g., 1302-1, 1302-2, 1302-3, . . . 1302-N). The number and spacing of the protrusions may vary and, as FIG. 13A depicts, determines, at least in part, the resolution of the spherical actuator 100. It should be noted that in FIG. 13A, the spherical stator 102 and the armature 104 are misaligned. Conversely, the spherical stator 102 and the armature 104 are aligned in FIG. 13B, and the position may be held with no applied power. Although this description relates to providing holding torque without an external brake or clutch, it will be appreciated that a brake or clutch could be used. Some non-limiting examples include various mechanical brakes (e.g., friction brakes, aerodynamic brakes, application of a mechanical load such as an external generator) and various electrical brakes (e.g., eddy current brakes, regenerative brakes, rheostatic or dynamic brakes, plugging or reverse current brakes).

Thermal management of the multi-degree of freedom spherical actuator 100 may be implemented using various techniques. Some non-limiting techniques include sizing the thickness of the spherical stator 102, as necessary, to conduct heat from the coils 202 to the device mounting structure, placing a fan inside the hollow spherical stator 102 to draw air in from one pole and out the other, providing efficient convective cooling, or enclosing the actuator 100 in a sealed transparent shell filled with a thermally conductive fluid.

The multi-degree of freedom spherical actuator 100 disclosed herein is relatively smaller, less cumbersome, and more efficient than known devices. It does not include a longitudinal coil that is difficult to wind, and it does not rely on a separate centering torque to implement open-loop position control of the armature 104. It can be used in various devices and systems to implement the functions of multiple actuator components. For example, when used in a control moment gyro (CMG) for satellite attitude control, the spherical actuator 100 can implement the functions of two spin motors and four torque motors. When used in a rotor swashplate control system for helicopters, the spherical actuator 100 can implement the functions of one spin motor and three linear actuators.

In addition to the above, the multi-degree of freedom spherical actuator 100 disclosed herein may be used in various technological devices and environments. For example, it may be coupled to a smartphone or other image capturing device to capture panoramic photos. It may be used in various vehicles (e.g., automobiles, watercraft, spacecraft, missiles, and aircraft) to provide, for example, sensor positioning, adaptive headlights, satellite antenna positioning, SONAR/LIDAR/RADAR directional control, just to name a few. It may be used to position solar cells, telescopes, and home security cameras. It may be used in various toy and gaming platforms. It may be used in robotics, in consumer devices (e.g., washing machines, dryers, dishwashers), and in vehicle transmission systems (e.g., continuous variable transmission (CVT).

Figure 39:
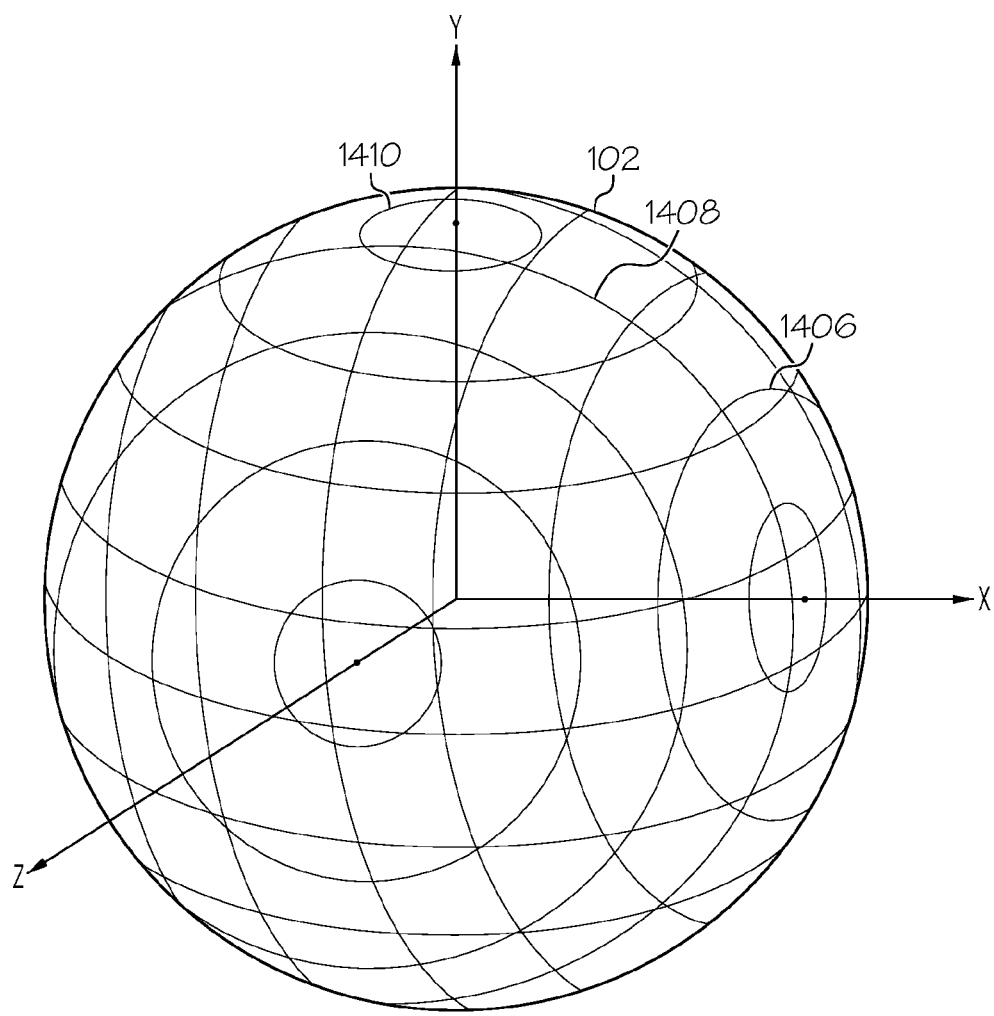
FIG. 39 depicts a perspective view of an embodiment of a spherical structure with orthogonally arranged conductor sets disposed thereon.

The embodiments described thus far are directed to electromechanical devices having conductors orthogonally disposed on a spherical stator (see FIG. 39), and a plurality of magnets. It will be appreciated, however, that the technical concepts described herein may extend beyond these described embodiments. In particular, the technical concepts may be embodied in myriad electromagnetic machines (e.g., motors, generators, and/or motor-generators), the conductor(s) may be disposed in various non-spherical shapes, or disposed on various non-spherical shaped structures, and may also be implemented with a single magnet. Such additional embodiments will now be described.

Figure 14:
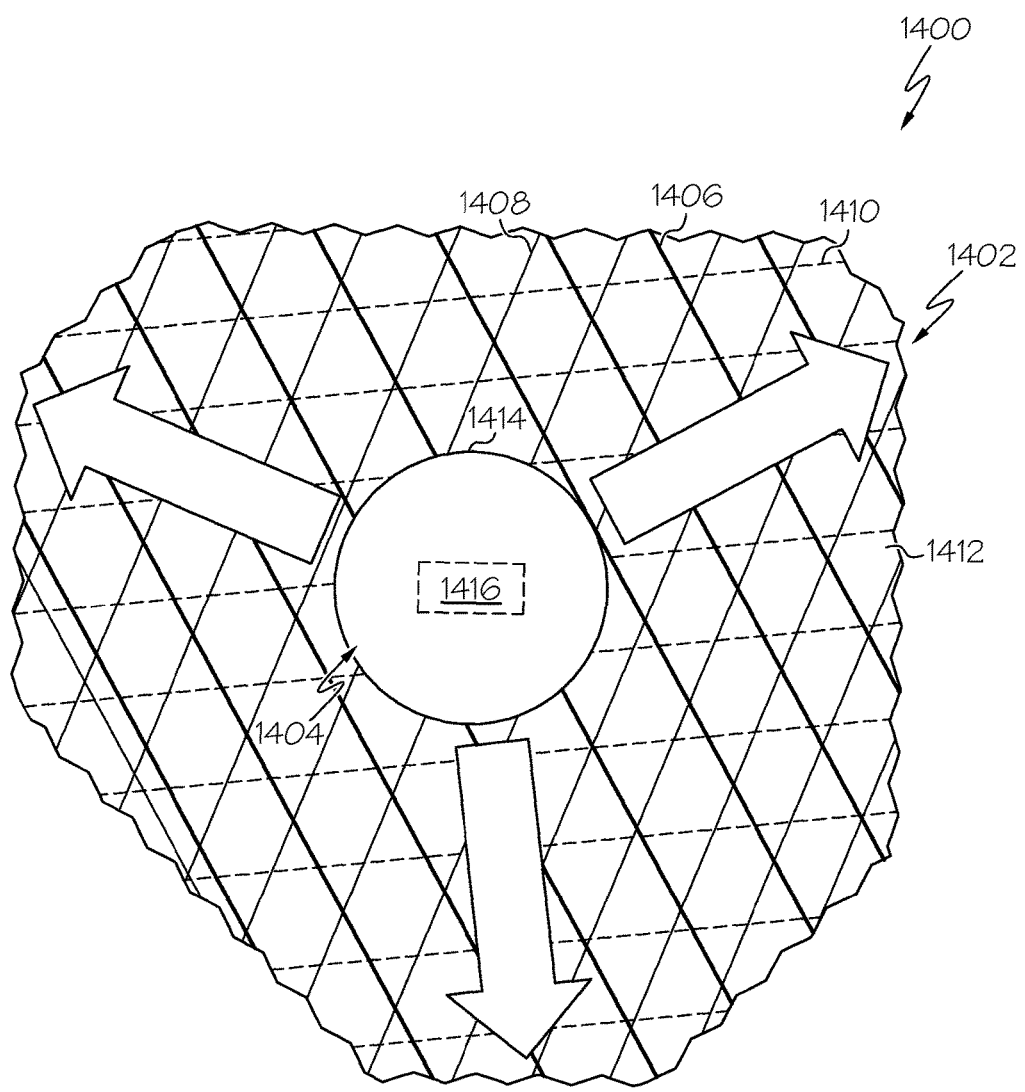
FIG. 14 depicts a simplified representation of a portion of another embodiment of a multi-degree-of-freedom electromagnetic machine.

Referring now to FIG. 14, a simplified representation of a portion of another embodiment of a multi-degree-of-freedom electromagnetic machine 1400 is depicted, and includes a first structure 1402 and a second structure 1404. The first structure 1402 includes a first conductor 1406, a second conductor 1408, and a third conductor 1410. It will be appreciated that the first, second, and third conductors 1406, 1408, 1410 are each formed of any one of numerous types and shapes of electrically conductive materials, and may be implemented using one or a plurality of these conductive materials. The first, second, and third conductors 1406, 1408, 1410 may each be implemented using single, discrete contiguous conductors, or using a plurality of conductors, and may be formed, for example, using additive (e.g., printed conductors) or subtractive (e.g., PWB etching)

techniques, and may be conductive wires, ribbons, or sheets, just to name a few non-limiting examples.

Regardless of the number, configuration, implementation, or type of materials used, the first, second, and third conductors 1406, 1408, 1410 are disposed such that each follows a different general trajectory. In particular, it is seen that the first conductor 1406 follows a first general trajectory, the second conductor 1408 follows a second general trajectory that is different from the first general trajectory, and the third conductor 1410 follows a third general trajectory that is different from the first and second general trajectories. In the depicted embodiment, the trajectories are not orthogonal to each other, but are instead disposed at arbitrary angles relative to each other. It will be appreciated, however, that in some embodiments two or all three of the trajectories may be disposed at equal or non-equal angles relative to each other, and that two or all three of the trajectories may be orthogonal. As used herein, the term "trajectory(ies)" means the geometric path traced by a conductor over a predefined length that is designed to contribute to the Lorentz force. For example, in some embodiments there may be some conductive lengths that may follow a trajectory to, for example, a power supply. These lengths, however, do not contribute to the Lorentz force, and likely do not contribute to the general shape of the surface.

The trajectories are such that together the first, second, and third conductors 1406, 1408, 1410 form the general shape of a surface. The surface can be formed by simply overlaying the conductors (and securing them, e.g. via adhesive), or may be formed by weaving two or more conductors. In the case of weaving, attention to the effects of the waviness on overall efficiency may need to be considered, as the Lorentz force produced on the wire is a function of the angle between the magnetic field and the current path. Thus, if the field and the current are not orthogonal to each other, the force is reduced.

Figure 15:
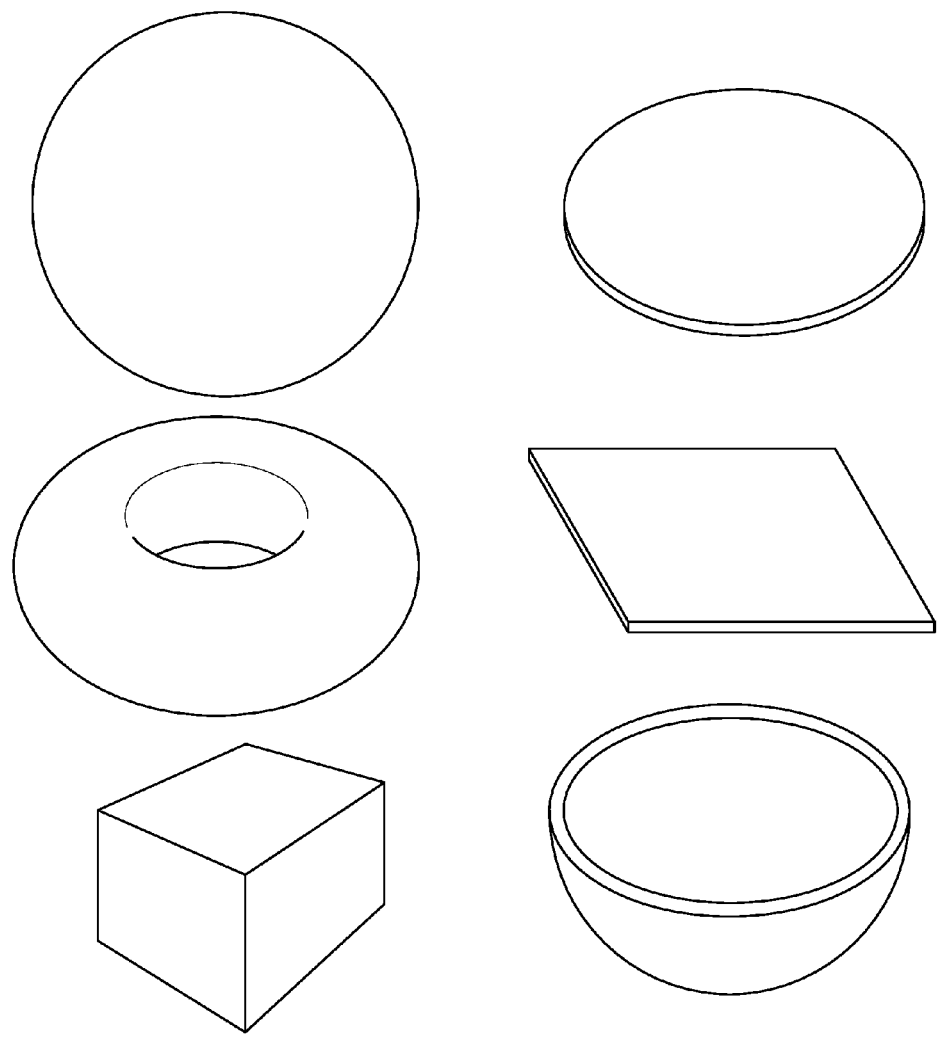
FIGS. 15-17 depict some non-limiting examples of surface types that may be used to implement the machine of FIG. 14.
Figure 16:
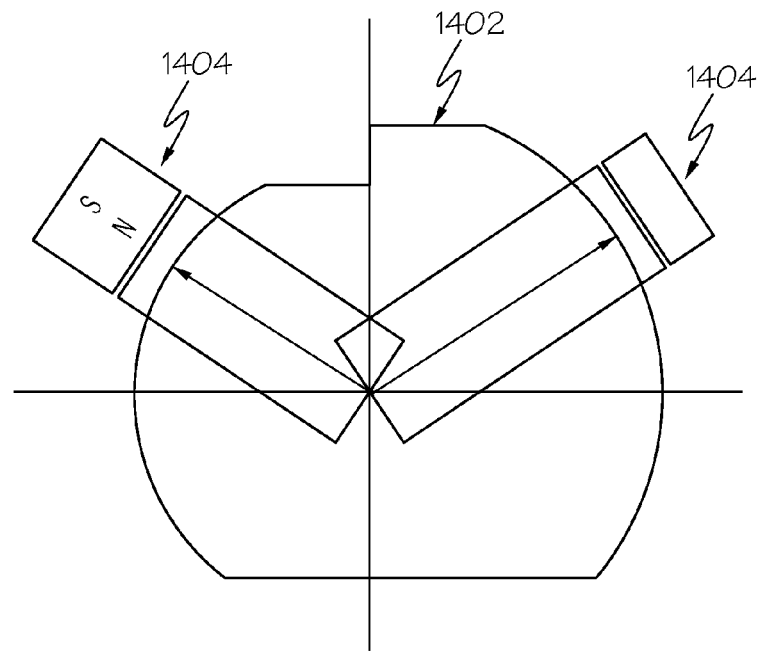
Figure 17:
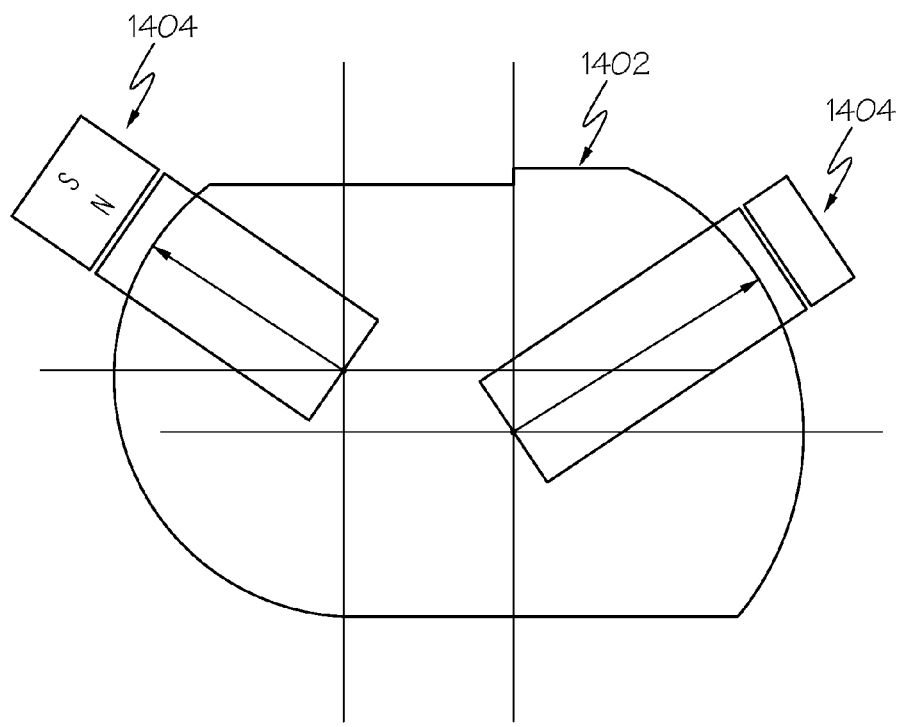

The type and shape of the surface may vary, and may be a closed surface, an open surface, a combination of closed and open surfaces, a planar surface, a non-planar surface, or a combination of planar and non-planar surfaces. For example, the surface may be spherical, semispherical, toroidal, cylindrical, cubic, flat, a half-pipe, or various combinations thereof, just to name a few. For completeness, some non-limiting examples of some of these surface types are depicted in FIGS. 15-17. The surface types depicted in FIGS. 16 and 17 illustrate examples of combinations of different surface types. In particular, these depicted different spherical portions of different radii on opposing hemispheres, and that the spherical portions may be truncated.

Figure 35:
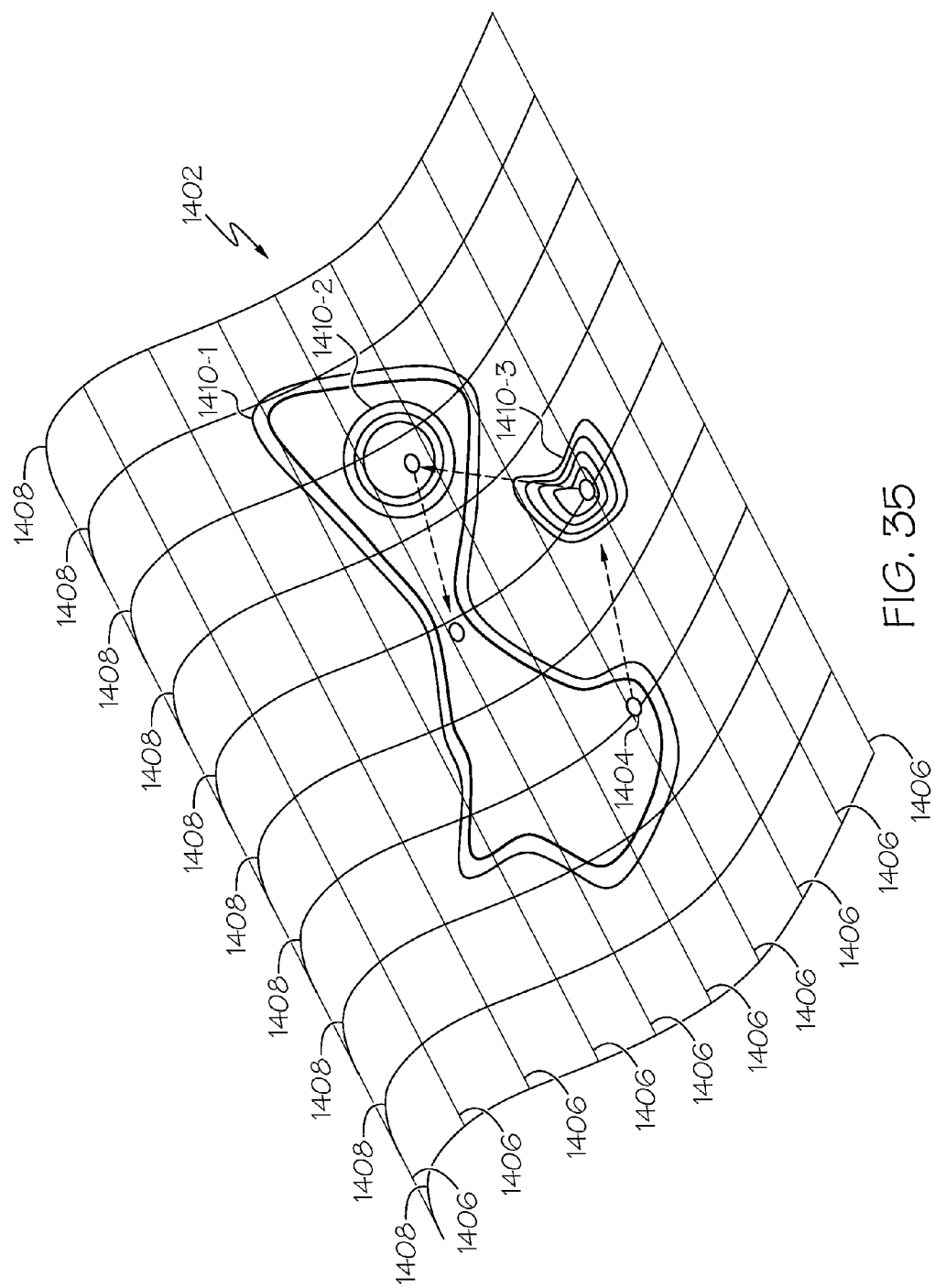
FIG. 35 depicts an embodiment of one useful context for a non-spherically shaped machine.

It is noted that non-spherical shapes, such as those mentioned above and depicted in FIGS. 15-17, may be advantageously used in various contexts, including, for example, package movers and amusement rides just to name a few non-limiting examples. In the case of package movers, two conductive trajectories can move a package from point A to point B, where the third conductive trajectory can be used to rotate the package mover about an axis. An example of an amusement ride would be toboggan/bobsled/luge runs. Here again two conductive trajectories can be used to move the riders from point A to B, where the third conductive trajectory can be used to spin the riders about an axis. Yet another example is depicted in FIG. 35, and is described further below.

Returning to FIG. 14, it is noted that in some embodiments the first structure 1402 comprises only the first, second, and third conductors 1406, 1408, 1410. In other embodiments, however, the first structure 1402 further comprises a first body 1412. The first body 1412, when included, is preferably formed of magnetically permeable material and has an outer surface. As is well known, such materials are used to conduct magnetic flux efficiently through the magnetic circuit, and to guide the flux to desired points/locations. Numerous suitable materials are known and include, for example, magnetic steel, iron, and iron alloys (e.g., silicon iron, iron-cobalt, vanadium), At least a portion of the outer surface of the first body 1412 preferably has the general shape of the surface, and the first, second, and third conductors 1406, 1408, 1410 are disposed at least adjacent to at least the portion of the outer surface 1414 of the first structure 1412.

The second structure 1404 is disposed adjacent to the first structure 1402 and includes a magnet 1412 that emanates a magnetic field. The magnet 1412 is disposed such that at least one of its magnetic poles faces the surface. In some embodiments the magnet 1412 is disposed such that the magnetic pole facing the surface is spaced apart therefrom by a predetermined gap. The gap, when included, is preferably small enough to minimize losses, which increases the magnetic efficiency by reducing magnetic reluctance. A relatively larger gap may allow for a more cost-effective design by loosening mechanical tolerances. In other embodiments, the magnet 1412 is disposed such that the magnetic pole contacts the surface. In this instance, the material selection of the contacting surfaces are chosen in consideration of wear and frictional losses, as is known in the art. It will be appreciated that the magnet 1412 may be variously configured and implemented. For example, it may be a permanent magnet or an electromagnet. If it is a permanent magnet, it may be implemented as a Halbach array. Some non-limiting examples of sources of suitable permanent magnets include Electron Energy Corporation (Landisville, Pa.), Arnold Magnetic Technologies (Rochester, N.Y.), Dexter Magnetic Technologies (Elk Grove Village, Ill.), and Dura Magnetics (Sylvania, Ohio). Moreover, as with the embodiment depicted in FIGS. 1-13B, and described above, the machine 1400 depicted in FIG. 14 may be implemented with a plurality of magnets 1412 (e.g., two or more).

Regardless of the number and type of magnets used, the machine is configured such that a Lorentz force affects relative movement between the first structure 1402 and the second structure 1404 when the magnetic field that emanates from the magnet 1412 interacts with electrical currents within any of the conductors 1406, 1408, 1410. The direction of the relative movement (depicted using arrows in FIG. 14), as may also by appreciated, is based at least on the magnitude and direction of the currents flow within the conductors 1406, 1408, 1410. As will be described further below, it may also be additionally based on frequency.

The relative movement between the first structure 1402 and the second structure 1404 makes the device 1400 amenable to having one or more devices 1416 coupled thereto. In particular, it may be desirable to have one or more devices coupled to the second structure 1404, similar to the device 115 depicted in FIG. 1, which is coupled to the armature 104. Although a single device 115 and 1416 is depicted in FIGS. 1 and 14, respectively, it will be appreciated that the number and types of devices 115, 1416 may vary. For example, the devices 115, 1416 may include one or more of a transducer, electronic circuitry, a storage element, a gyroscopic mass, an electromagnetic reflector, an electromagnetic absorber, a lens, a gas or fluid nozzle, a work tool, a robotic effector, a carrier for transporting animate or inanimate objects, and a motor, just to name a few non-limiting examples.

Figure 18:
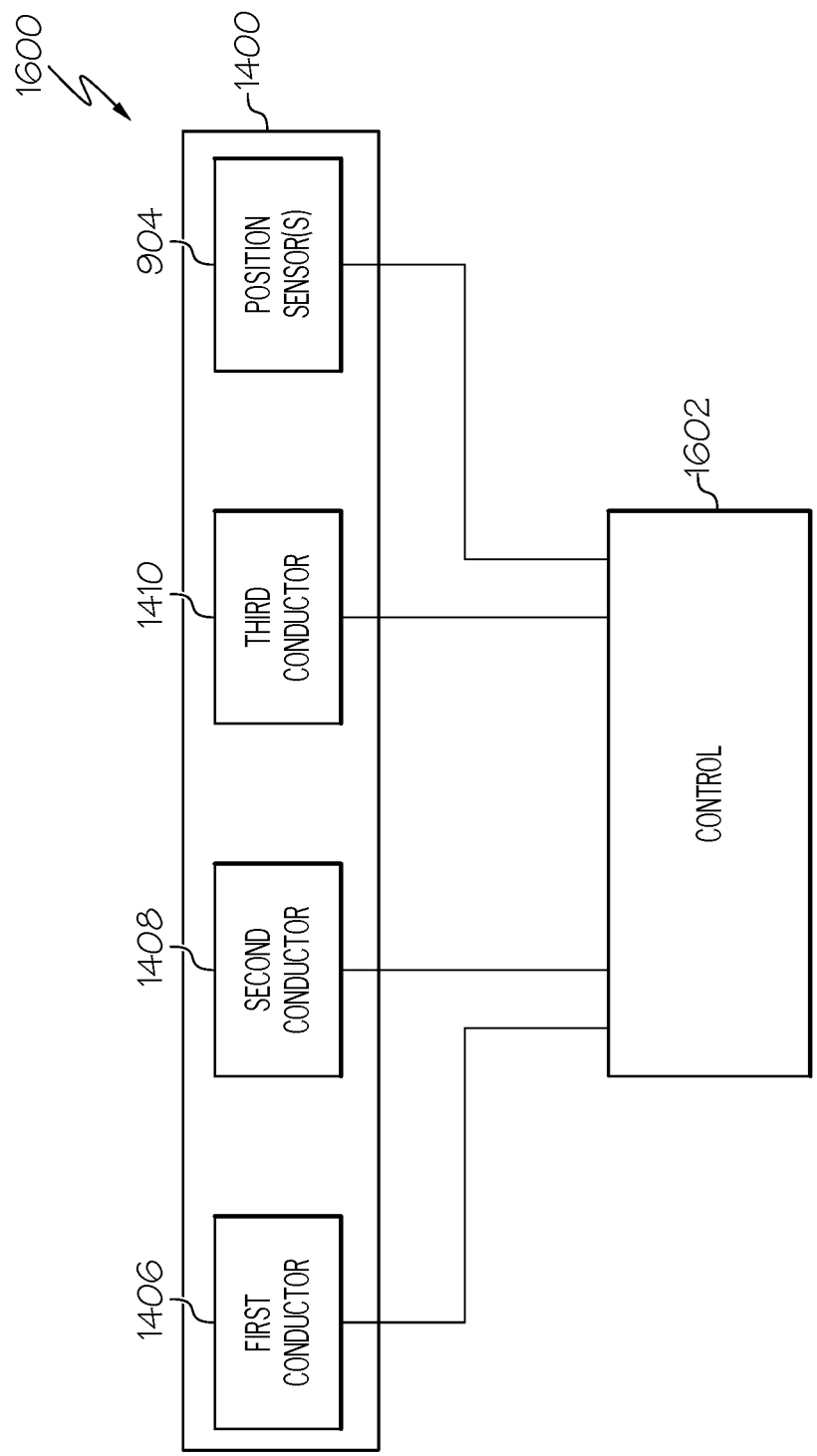
FIG. 18 depicts a functional block diagram of a multi-degree of freedom control system.

Similar to the embodiments previously described, and as depicted in FIG. 9, the electromagnetic machine 1400 depicted in FIG. 14 may also be implemented in a control system 1600, such as the one depicted in FIG. 18. As with the system depicted in FIG. 9, the system 1600 depicted in FIG. 18 includes a control 1602 that is coupled to each of the first, second, and third conductors 1406, 1408, 1410. The control 1602 is configured to control the current magnitudes and directions in each of the conductors 1406, 1408, 1410 to thereby control the relative movement between the first structure 1402 and the second structure 1404, and thus the relative position of the device 1416 (if included). As with the control 902 previously described, the control 1602 depicted in FIG. 18 may be configured to implement this functionality using either open-loop control or closed-loop control. Open-loop control provides relatively lower cost, less complexity, relatively simple DC operation, and relatively lower size and weight. Closed-loop control provides higher accuracy and precision, higher bandwidth, and autonomous control. Various control techniques could be implemented in the control 1602. Some non-limiting examples of suitable control techniques include PWM control and back EMF control.

The machine 1400 depicted in FIG. 14, as well as the machine 100 depicted in FIGS. 1-13 and previously described, may be configured and controlled to implement numerous and varied functions. Some of these functions will now be described. Before doing so, however, it is noted that, for ease of description and depiction, each of the functions will be described for an electromagnetic machine configured similar to the ones depicted in FIGS. 1-13. That is, the first structure 1402 is generally spherically shaped, and the second structure 1404 surrounds, or at least partially surrounds, a portion of the first structure.

Figure 19:
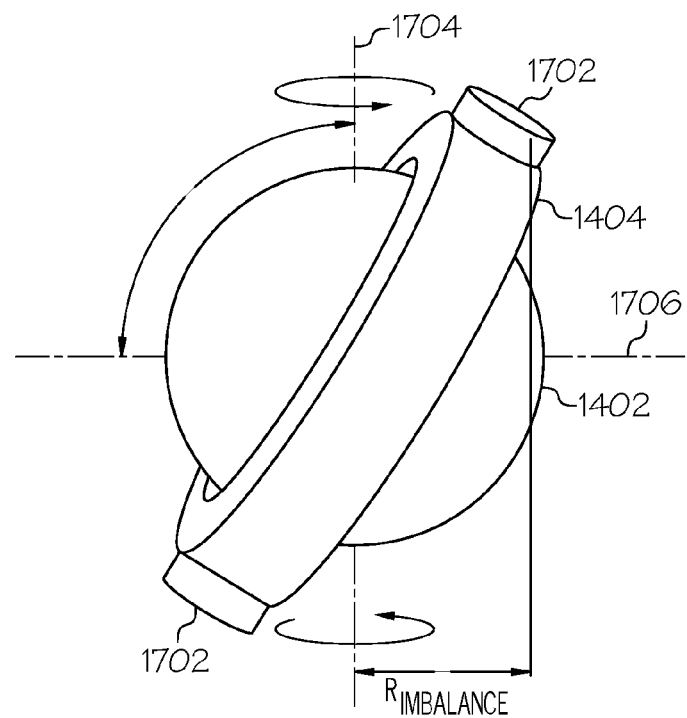
FIGS. 19-22 depict an embodiment of the machines described herein configured to generate vibratory haptic feedback according to a first embodiment.

The first function to be described is a haptic feedback function. In particular, and with reference now to FIG. 19, it is seen that in one embodiment that is used to implement this function, one or more imbalance masses 1702 (two in the depicted embodiment) are coupled to the second structure 1404, and the control 1602 is configured to independently control the current magnitudes and directions in each of the first, second, and third conductors 1406, 1408, 1410, as well as the frequencies of the currents supplied to each of the first, second, and third conductors 1406, 1408, 1410 to control movement of the second structure 1404. More specifically, the control 1602 controls the current magnitudes, directions, and frequencies supplied to each of the first, second, and third conductors 1406, 1408, 1410 to cause the second structure 1402 to rotate about a first axis 1704 and to selectively tilt relative to a reference plane 1706. The tilting of the second structure 1404 relative to the reference plane 1706 varies the imbalance radius ($R_{IMBALANCE}$), which is the radius of rotation of the second structure 1404 about the first axis 1704. This, in turn, varies the amplitude of the haptic feedback.

Figure 20:
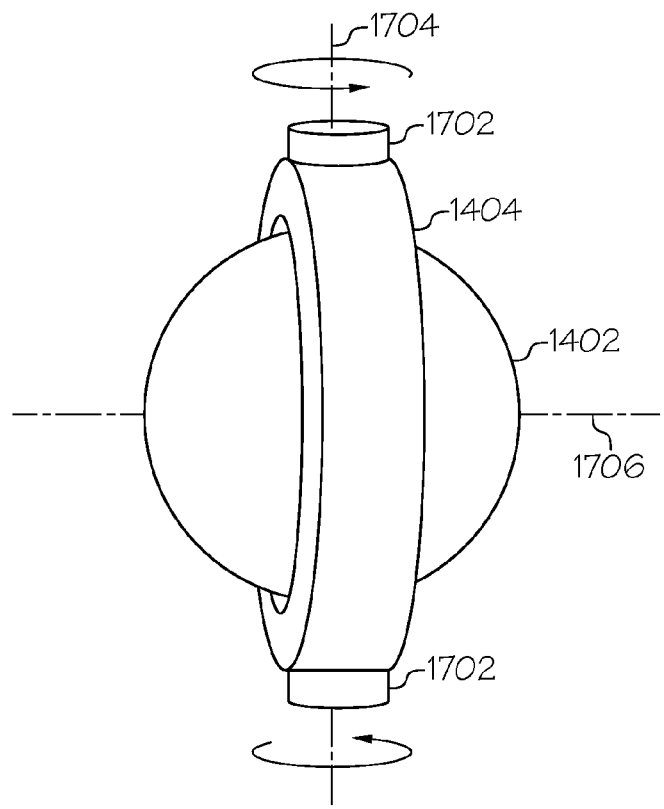
Figure 21:
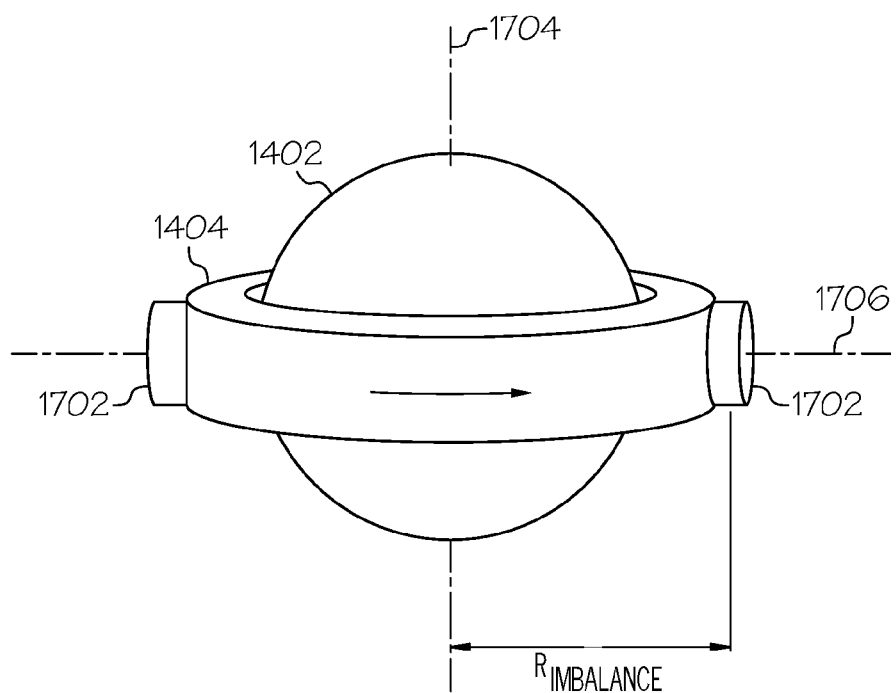
Figure 22:
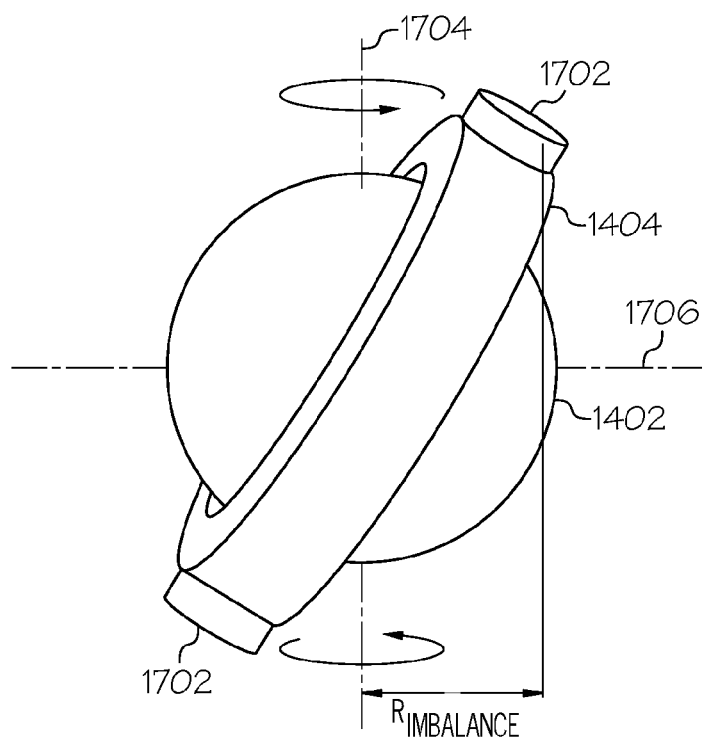

To illustrate this more clearly, for a given rotational speed of the second structure 1404 about the first axis 1704, the amplitude of the haptic feedback is zero when, as depicted in FIG. 20, the second structure 1404 is orthogonal to the reference plane 1706, and thus the imbalance radius imbalance radius ($R_{IMBALANCE}$) is zero. Conversely, and again for a given rotational speed of the second structure 1404 about the first axis 1704, the amplitude of the haptic feedback is maximum when, as depicted in FIG. 21, the second structure 1404 is aligned with the reference plane 1706, and thus the imbalance radius imbalance radius ($R_{IMBALANCE}$) is maximum. As may be appreciated, and as FIG. 22 depicts, the amplitude of the haptic feedback, for a given rotational speed of the second structure 1404 about the first axis 1704, may be varied between zero and maximum by tilting the second structure 1404 to a position that is between the orthogonal and aligned positions. It should be noted that, for a given position of the first axis 1704, the amplitude of the haptic feedback can also be varied by varying rotational speed of the second structure 1404 about the first axis 1704.

Figure 23:
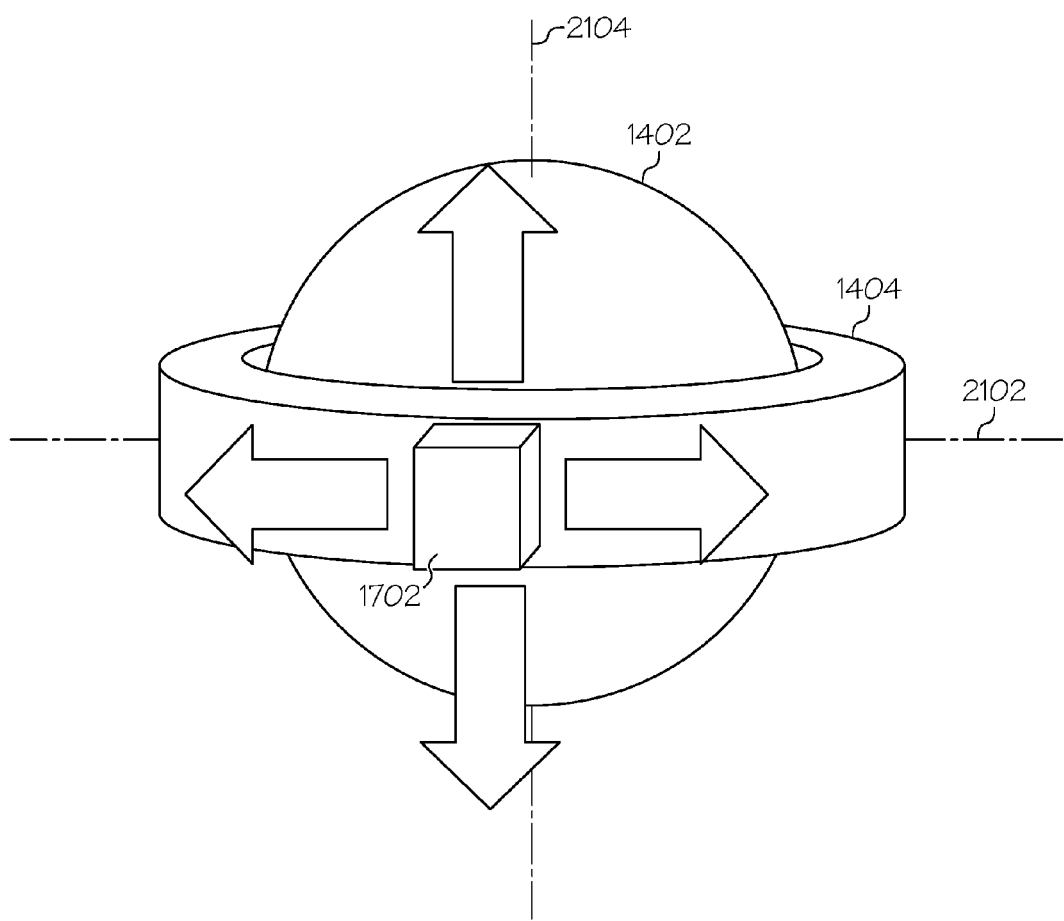
FIG. 23 depicts an embodiment of the machines described herein configured to generate vibratory haptic feedback according to a second embodiment.

In another embodiment, which is depicted in FIG. 23, the machine 1400 can be controlled to generate independent vibratory haptic feedback along two axes. To do so, the control 1602 independently controls the current magnitudes and directions in each of the first, second, and third conductors 1406, 1408, 1410, as well as the frequencies of the currents supplied to each of the first, second, and third conductors 1406, 1408, 1410 to cause the second structure 1404 to simultaneously oscillate, relative to the first structure 1402, about orthogonally disposed first and a second axes 2102, 2104. As with the embodiment depicted in FIGS. 19-22, one or more imbalances masses 1702 are coupled to the second structure 1404.

Figure 24:
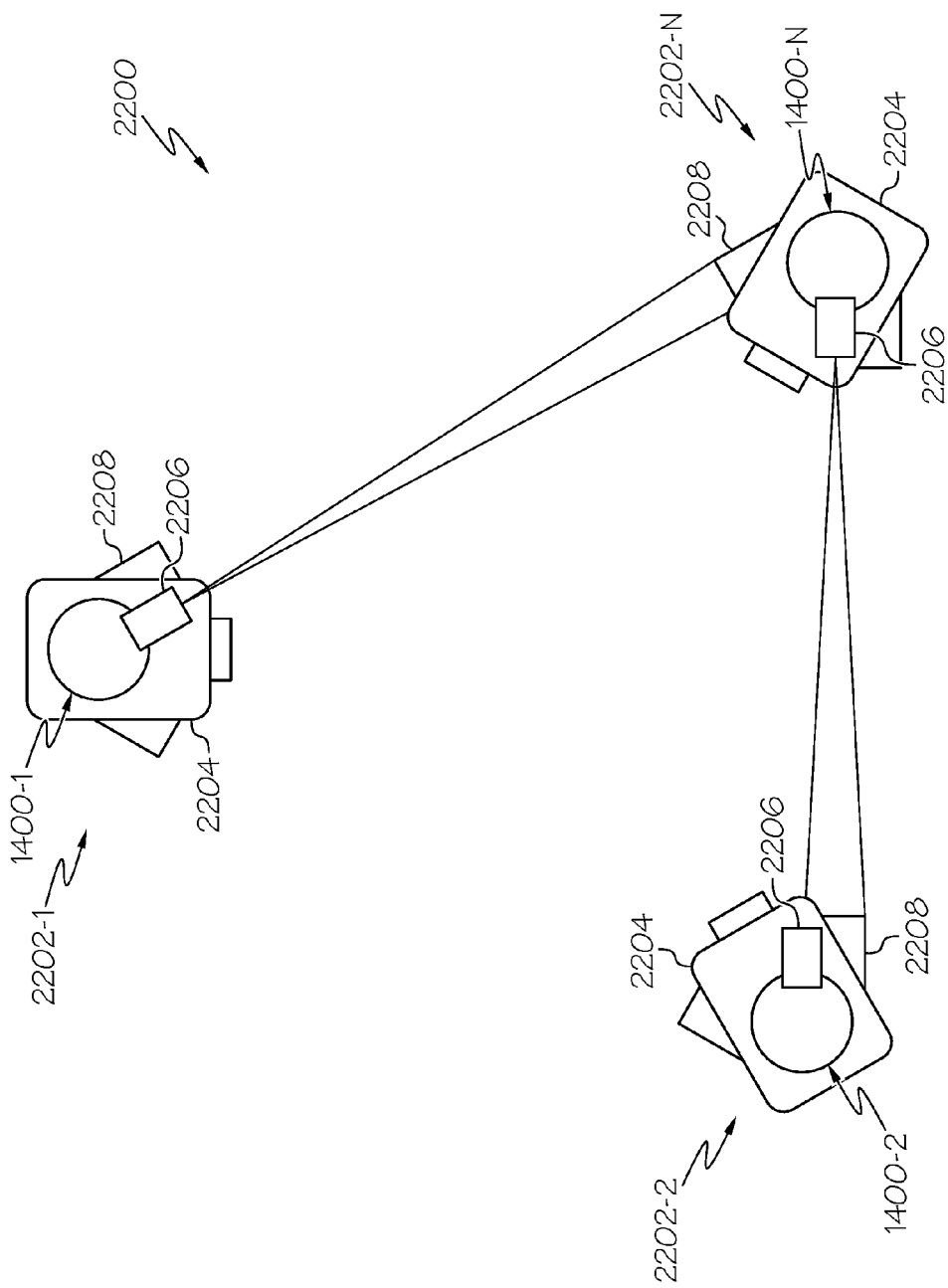
FIGS. 24 and 25 depict an embodiments of the machines described herein being used to implement different embodiments of a cooperative sensor network.
Figure 25:
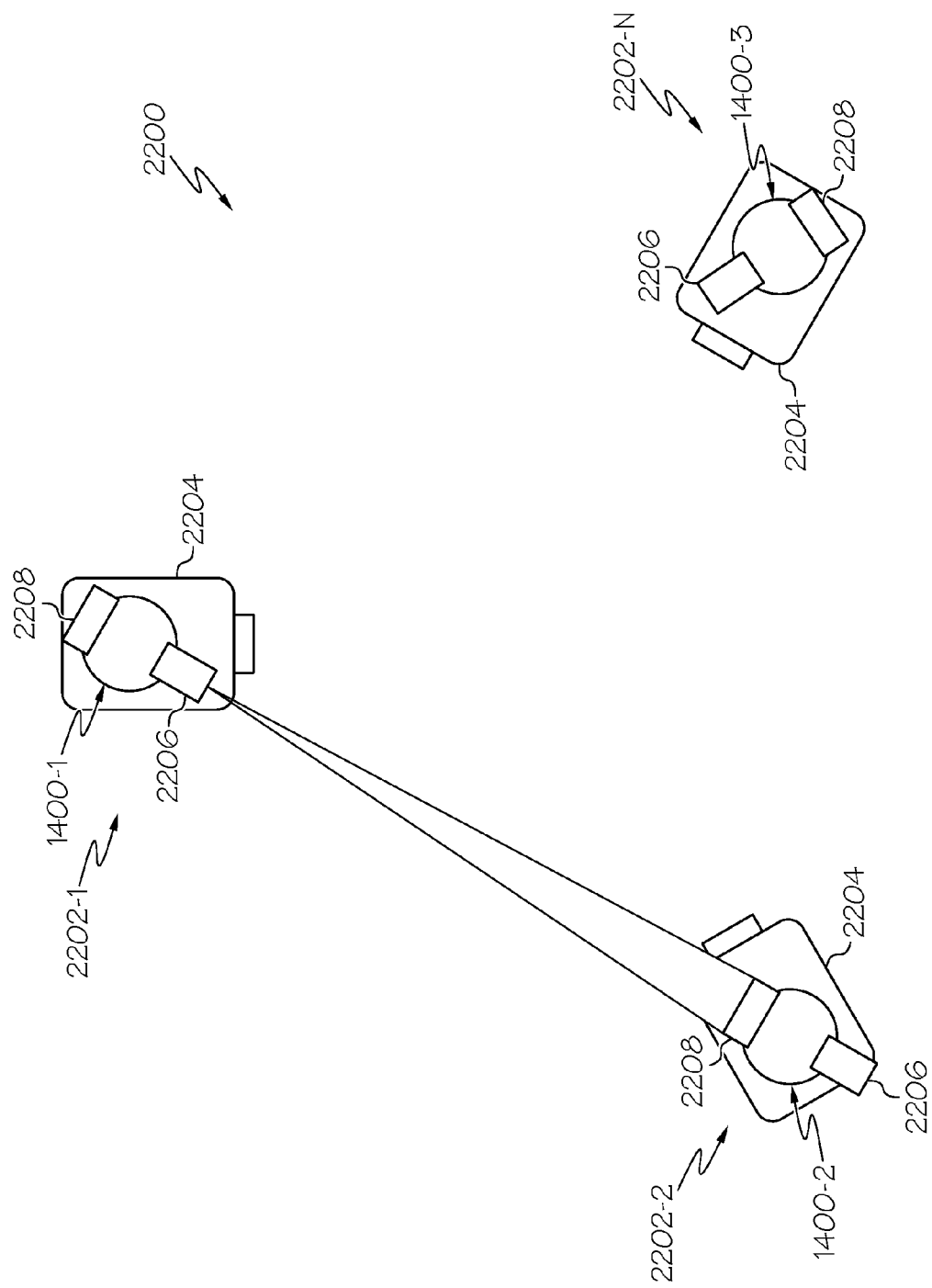

In other embodiments, which are depicted in FIGS. 24 and 25, plural machines 1400 (e.g., 1400-1, 1400-2, . . . 1400-N) are employed to implement a cooperative sensor network 2200. The network 2200 includes a plurality of sensor systems 2202 (e.g., 2202-1, 2202-2, . . . 2202-N), each mounted on a different one of the plural machines 1400 (e.g., 1400-1, 1400-2, . . . 1400-N). Each sensor system 2202 includes a sensor 2204, a transmitter 2206, and a receiver 2208. In the embodiment depicted in FIG. 24, the transmitter 2206 of each sensor system 2202 is each coupled to either the first structure 1402 or the second structure 1404, and is moveable therewith, while the receiver 2208 of each sensor system 2202 remains stationary. In the embodiment depicted in FIG. 25, both the transmitter 2206 and receiver 2208 of each sensor system 2202 are both coupled to either the first structure 1402 or the second structure 1404, and are moveable therewith.

In the depicted embodiments, the communication link between the sensor systems 2202 is accomplished via narrow-beam wireless transmission that is directed from the transmitter 2206 of one sensor system 2202 to a single receiver 2208 of another sensor system 2202. When one sensor system 2202 (e.g., a first sensor system 2202-1) wants to communicate with another sensor system 2202 (e.g., a second sensory system 2202-2) in the sensor network 2202, the machine 1400-1 on which the first sensor system 2202-1 is mounted is controlled to move the first sensor system 2202-1 so as to direct a communication link transmission (Tx) toward the second sensor system 2202-2.

In the embodiment depicted in FIG. 24, because the receiver 2208 of each sensor system 2202 remains stationary, each receiver 2208 is preferably implemented using a wide-area receiver that is capable of receiving transmissions from multiple directions. Moreover, each receiver 2208 is aligned to a single transmitter 2206 of another sensor system 2202. The control 1602 associated with each machine 1400 is configured to independently control at least the current magnitudes and directions in each of the first, second, and third conductors 1406, 1408, 1410 to thereby point the associated transmitter 2206 in a desired direction. For example, in FIG. 24 the machine 1400-1 of sensor system 2202-1 is controlled to point its associated transmitter 2206 toward the receiver 2208 associated with sensor system 2202-N, and the machine 1400-N of sensor system 2202-N is controlled to point its associated transmitter 2206 toward the receiver 2208 associated with sensor system 2202-2.

In the embodiment depicted in FIG. 25, wide-area receivers 2208 need not, though may, be used. No matter, the control 1602 associated with each machine 1400 is configured to independently control at least the current magnitudes and directions in each of the first, second, and third conductors 1406, 1408, 1410 to thereby point the associated transmitter 2206 and receiver 2208 in a desired direction. For example, in FIG. 25 the machine 1400-1 of sensor system 2202-1 is controlled to point its associated transmitter 2206 toward the receiver 2208 associated with sensor system 2202-2, and the machine 1400-2 of sensor system 2202-2 is controlled to point its associated receiver 2208 toward the transmitter 2206 associated with sensor system 2202-1 so as to receive data transmitted from the sensor system 2202-1.

The security of the cooperative sensor networks 2200 described herein provides significant improvements and advantages over known networks. In particular, the narrow beam width of the communication link can only be interrupted by a device physically located in the line-of-sight between the transmitting sensor system and the receiving sensor system. A communication link only exists between network sensor systems that are actually communicating with each other. Consequently, the physical path carrying network data changes dynamically from one part of the network to another, and a person wishing to intercept the signal never knows where this communication link is. If a sensor system detects a disruption in its received signal, it can direct its own transmission toward the opposing sensor system and command it to stop transmitting or redirect its transmission to a different sensor system.

Figure 26:
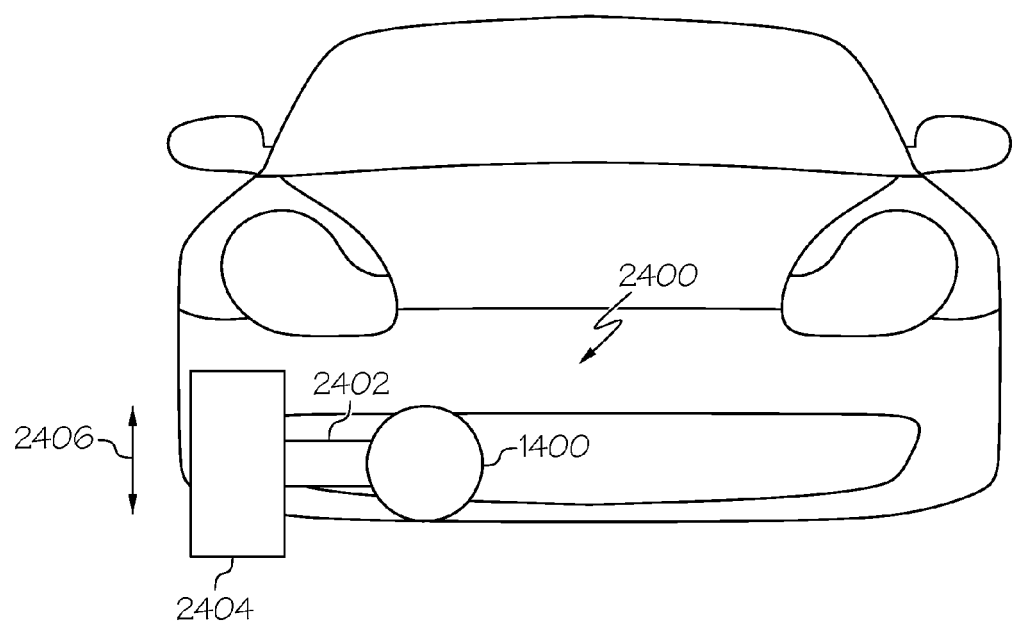
FIG. 26 depicts an embodiment of the machines described herein implemented in an automobile drive train.

The machines 100, 1400 depicted and described herein may also be implemented in various vehicles, such as automobiles. In particular, the machines 100, 1400 may be implemented in automobile drive trains, suspensions, anti-slip/anti-skid, steering linkages (e.g., rack and pinion), and braking systems. Referring first to FIG. 26, one embodiment is depicted in which the machines 100, 1400 are implemented in an automobile drive train 2400. In the depicted embodiment, in which only a single wheel is depicted for clarity, the drive train includes a machine 1400, a shaft 2402, and a wheel-mounted tire 2404. In this embodiment, the shaft 2402 is coupled to the second structure 1404 of the machine 1400, and is driven when the associated control 1602 commands the second structure 1404 to rotate at a desired rotational speed. The shaft 2402, which is coupled to the wheel-mounted tire 2404, in turn causes the wheel-mounted tire 2404 to rotate at the desired speed.

As FIG. 26 also depicts, the control 1602 associated with the machine 1400 can also command the second structure 1404 to tilt, to thereby control the suspension, as indicated by arrow 2406. The anti-skip/anti-skid functionality can be implemented by including a sensor 2408 that is configured to sense when the wheel-mounted tire 2404 is slipping. In response, the associated control 1602 commands the second structure 1404 to tilt, to thereby "push" the wheel-mounted tire 2404 more toward the road.

Figure 27:
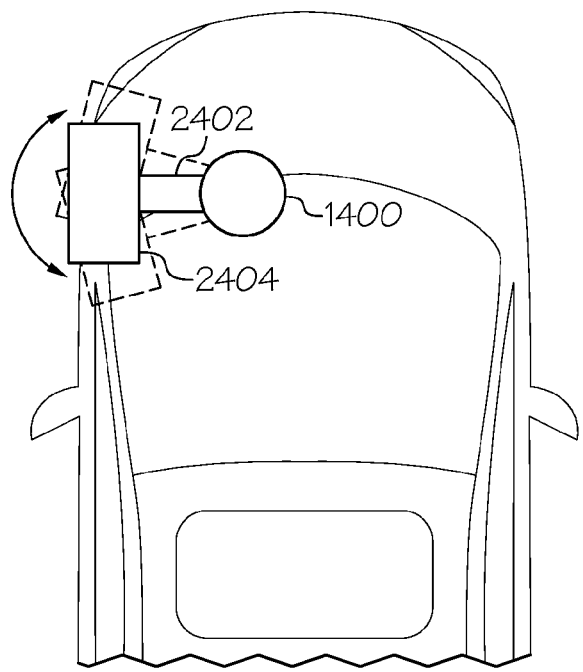
FIG. 27 depicts an embodiment of the machines described herein configured to implement an automobile steering function.

With reference to FIG. 27, the steering function is depicted. In the depicted embodiment, each wheel-mounted tire 2404 is independently steered by the control 1602 associated with the machine 1400 commanding the second structure 1404, and thus the shaft 2402 and wheel-mounted tire 2404, to rotate as indicated. As may be appreciated, independent wheel steering eliminates the need for a differential, and can also minimize vehicle turning radius. Such an approach could, for example, facilitate parallel parking and other tight-space parking maneuvers, as well as moving out of the way in bumper-to-bumper traffic for emergency vehicles to pass.

Figure 28:
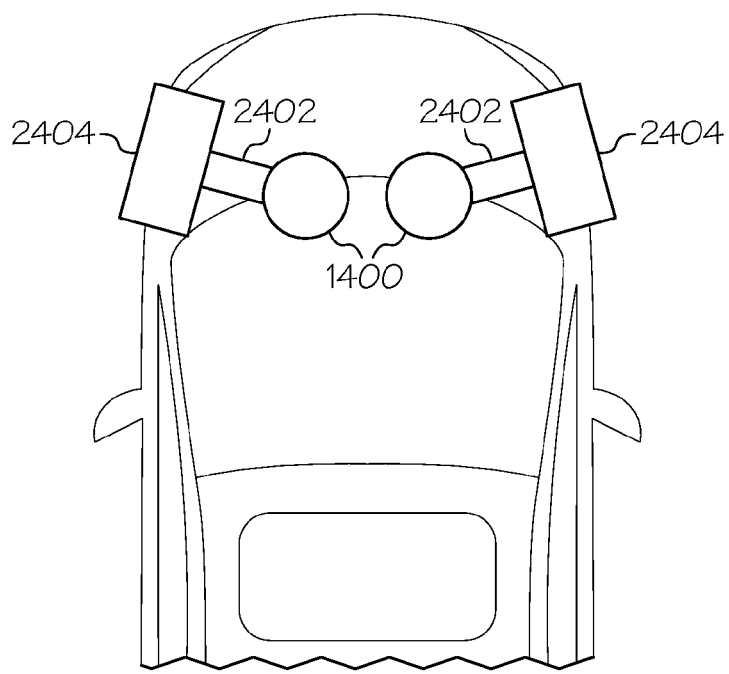
FIG. 28 depicts an embodiment of the machines described herein configured to implement an automobile braking function.

Turning now to FIG. 28, the braking functionality will now be described. The general braking function, including the anti-lock braking function, can be implemented by controlling the current magnitudes and directions in each of the first, second, and third conductors 1406, 1408, 1410. An emergency braking function can also be implemented by, for example, the controls 1602 associated with each of the two front machines 1400 command the wheel-mounted tires 2404 to rotate inwardly, or "snowplow." By "snowplowing" the wheel-mounted tires 2404, more friction is created between the wheel-mounted tires 2404 and the ground.

Figure 29:
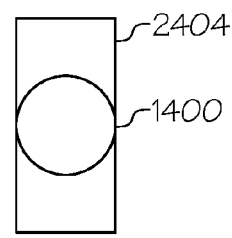
FIG. 29 depicts an embodiment of the machines described herein directly mounted a vehicle wheel.

Before proceeding further, it is noted that each of the above-described functions may also be implemented by directly mounting a machine 1400 inside of the wheel on which the tire is mounted. This configuration, which is depicted in FIG. 29, thus eliminates the need for the shaft 2402.

Figure 30:
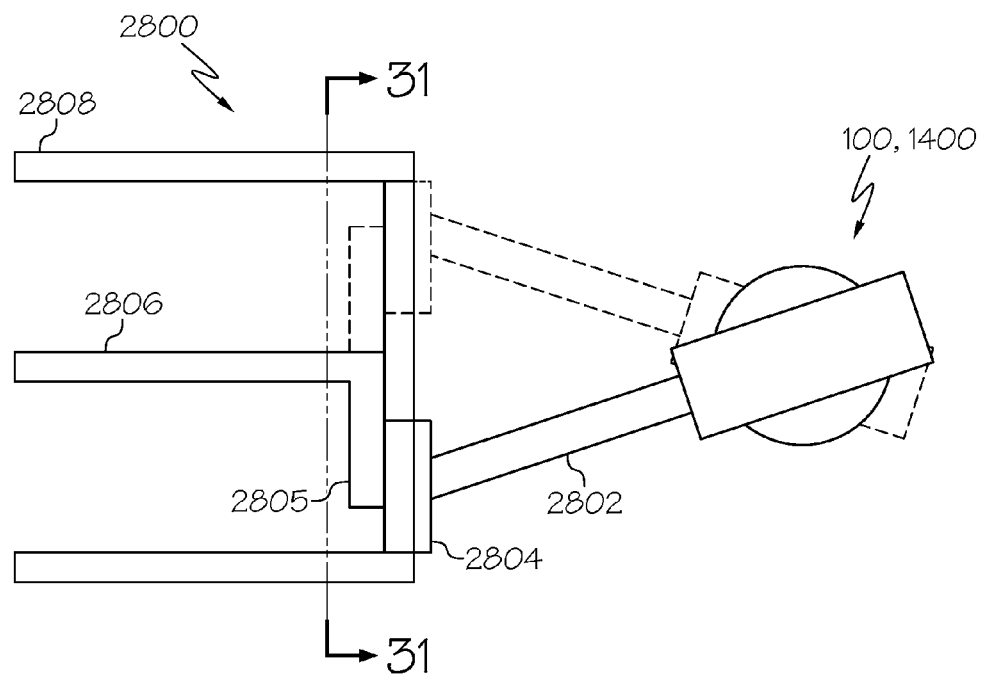
FIGS. 30 and 31 depict an embodiment of the machines described herein configured to implement a dual shaft drive.
Figure 31:
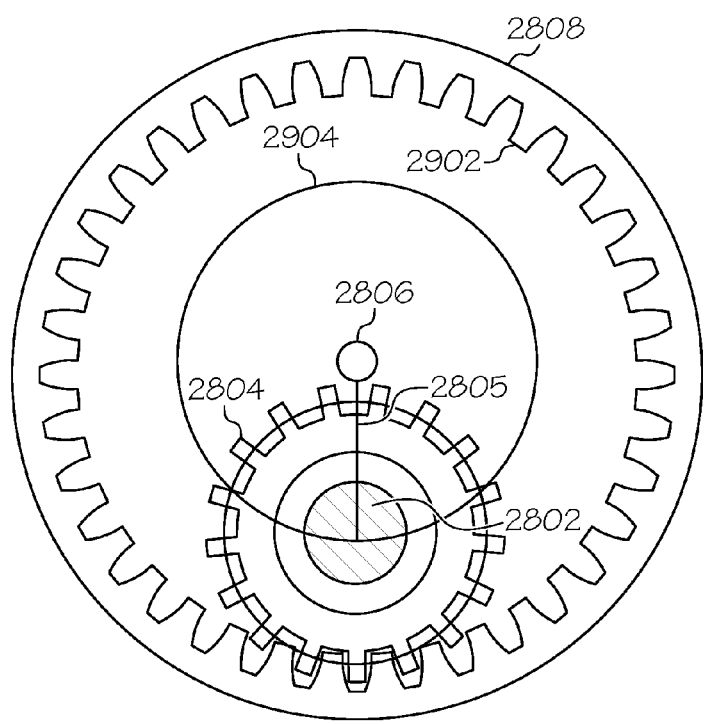

With reference now to FIGS. 30 and 31, it is seen that the machines 100, 1400 described herein may also be used to implement a dual shaft drive assembly 2800. In the depicted embodiment, the second structure 1402 is coupled, via an input shaft 2802, to a pinion gear 2804. The pinion gear 2804 is coupled, via a linkage 2805, to an inner shaft 2806. As depicted more clearly in FIG. 31, the pinion gear 2804 additionally meshes with an annular gear 2902 that is formed on an inner surface of an outer shaft 2808.

The machine 1400 is used to control the rotational speed and direction of both the inner shaft 2806 and the outer shaft 2808. In particular, the control 1602 is configured to independently control the current magnitudes and directions in each of the first, second, and third conductors 1406, 1408, 1410, as well as the frequencies of the currents supplied to each of the first, second, and third conductors 1406, 1408, 1410 to control the rotational speed and direction of the pinion gear 2804, which, because the pinion gear 2804 meshes with the annular gear 2902, in turn controls the rotational speed and direction of the outer shaft 2808. The control 1602 is additionally configured to independently control the current magnitudes and directions in each of the first, second, and third conductors 1406, 1408, 1410, as well as the frequencies of the currents supplied to each of the first, second, and third conductors 1406, 1408, 1410 to control the speed and direction of the orbit 2904 (see FIG. 31) of the pinion gear 2804. Because the pinion gear 2804 is also coupled, via the linkage 2805, to the inner shaft 2806, the inner shaft 2806 speed and direction is also controlled, independent of the speed and direction of the outer shaft 2808.

As noted previously when describing the embodiment depicted in FIG. 1, the machine 100 may be used to implement a variable momentum control moment gyroscope (CMG). It should be noted, however, that the machine 1400 depicted in FIG. 14 may also be used to implement a variable momentum CMG. As is generally known, CMGs are used to control the attitude of a spacecraft, such as a satellite. Presently known CMGs typically include a spin motor, a torque motor, and a momentum wheel (or flywheel). The spin motor rotates the wheel about its centerline axis at some velocity, and the torque motor rotates the wheel through a limited angle about an orthogonal axis. These two motions generate a gyroscopic torque, about a third orthogonal axis, that is proportional to the spin velocity and the tilt angle of the wheel. Typically the spin motor is relatively small, because only a small torque is required to maintain the spin velocity (once it has reached this velocity), and because the torque motor must move the spin motor along with the wheel.

A fundamental limitation of CMGs is the existence of "singularities" within the momentum envelope of the CMG system. These are specific positions at which the CMG system cannot generate any momentum, due to the alignment of momentum vectors. As may be appreciated, these positions are avoided to prevent the satellite from becoming effectively stuck in a position. One way to mitigate this problem is to mount the CMG in a two-axis gimbal and add a second torque motor. This second motor can then adjust the amplitude of the momentum vector to avoid the singularities. However, this obviously adds undesirable size, weight, and complexity to the system, especially since the second torque motor must work against the gyroscopic torque generated by the first torque motor. Another method is to vary the spin velocity of the wheel while it is being tilted, resulting in what is called a "variable-speed CMG." In practice, however, this is rarely implemented because it requires much higher torques on the spin axis, which results in a larger spin motor, larger toque motor, and larger size and weight overall.

Figure 32:
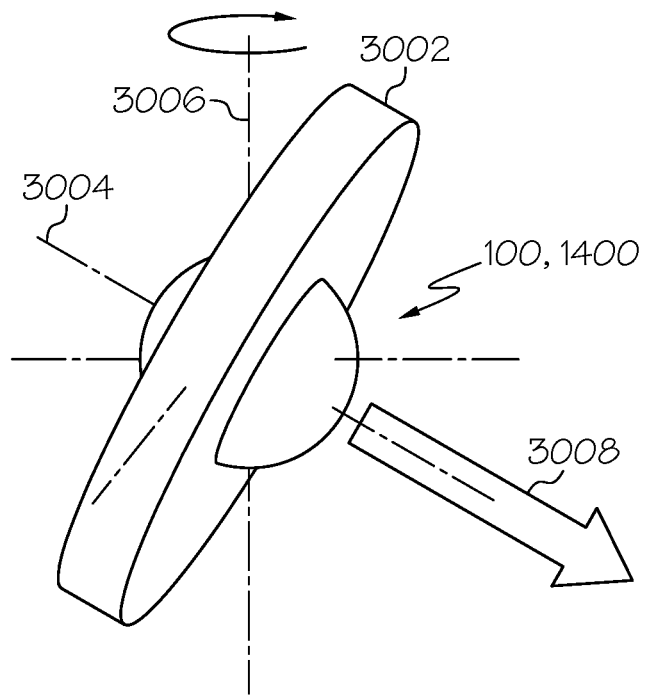
FIGS. 32 and 33 depict an embodiment of the machines described herein configured to implement a variable momentum control moment gyroscope.

As depicted in FIG. 32, by using the machines 100, 1440 described herein, a CMG 3000 is operated and controlled using a single 2-axis machine 100, 1400 in the center of a wheel 3002, rather than by separate spin and torque motors. The machine 100, 1400, and more particularly the second structure 1404, is coupled to the wheel 3002. The second structure 1404 is configured to rotate, relative to the first structure 1404, at a rotational speed about a first axis 3004, and to rotate, relative to the first structure 1402, to a rotational position about a second axis 3006 that is orthogonal to the first axis 3004.

As described previously (see FIGS. 6-8 and associated description), the control 1602 associated with the machine 1400 is configured to independently control the current magnitudes and directions in each of the first, second, and third conductors 1406, 1408, 1410, and the frequencies of the currents supplied to each of the first, second, and third conductors 1406, 1408, 1410, to thereby control the rotational speed and the rotational position of the second structure. This avoids momentum singularities in two ways. The first way, which is depicted most clearly in FIG. 32, is by varying the tilt axis 3006 of the wheel 3002 by varying the relative phase between the spin commands and the tilt command, which modifies the momentum vector 3008. This is similar to the known 2-axis gimbal solution described above, but without the additional motor.

Figure 33:
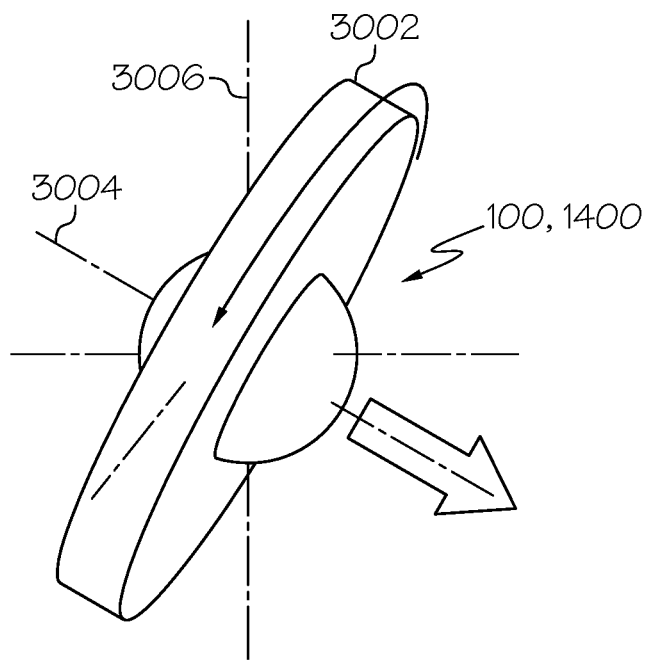

The second way, which is depicted most clearly in FIG. 33, is by varying the spin velocity of the wheel 3002, which also modifies the momentum vector 3008. This, too, is similar to the known 2-axis gimbal solution described above, but without any increase in size or weight. Because the spin and tilt motions are both driven by the stationary conductors 1406, 1408, 1410, the conductors 1406, 1408, 1410 used to generate spin can be sized, as necessary, independently of the conductors 1406, 1408, 1410 used to generate tilt.

Figure 34:
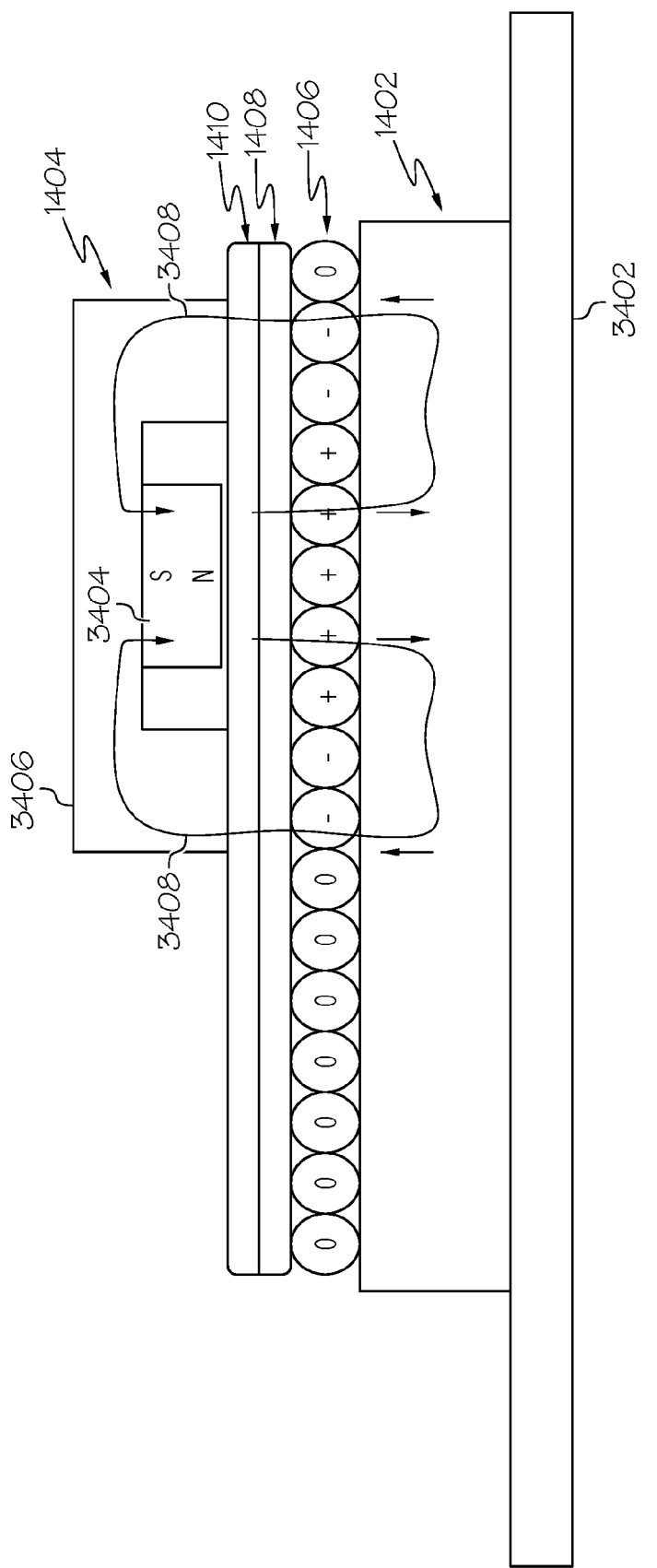
FIG. 34 depicts an example of one embodiment of a machine configured as a planar voice coil.

The machine 1400 described herein may also be used to implement a planar voice coil. An example of one embodiment of a planar voice coil is depicted in FIG. 34, and will be described. Before doing so, however, it is noted that the approach described herein can be extended to non-planar applications. The depicted machine 1400 includes the first structure 1402, the second structure 1404, and the three sets of conductors 1406, 1408, and 1410. In the depicted embodiment, the first structure 1402 comprises a suitable magnetically permeable material, such as those previously mentioned, and the conductors 1406, 1408, 1410 are preferably orthogonally disposed thereon. As FIG. 34 also depicts, the first structure 1402 may be disposed on a mounting structure 3402.

The second structure 1404, at least in the depicted embodiment, includes one or more magnets 3404 (only one depicted) coupled to a magnet mount structure 3406. The magnet 3404 may be any one or more of the previously mentioned permanent magnets or electromagnets.

Preferably, the machine 1400 is coupled to a control 1602 (not depicted in FIG. 34) that is configured to individually control the current supplied to each conductor in a conductor set 1406, 1408, 1410, so that certain conductors in a conductor set may have no current flow, while others may have current flow in opposing directions. For example, at the instant in time depicted in FIG. 34, some conductors in the first set 1406 have no current flow (indicated using a "0"), some have positive current flow (indicated using a "+"), while others have negative current flow (indicated using a "−"). The negative current compensates for the changed direction of the magnetic field 3408, but may not be used in some embodiments to minimize any complexity associated with the drive electronics in the control 1602.

It was previously noted that some non-spherical shapes, such as the ones depicted in FIGS. 15-17 and the one just described (FIG. 34), may be used in various contexts, such as package movers and amusement rides. One non-limiting context is depicted in FIG. 35, in which the topology of the first structure 1402 is non-planar. In the depicted embodiment, the first and second conductors 1406, 1408 are disposed orthogonal to each other. The depicted machine 1400 additionally includes plural sets of third conductors 1410 (e.g., 1410-1, 1410-2, 1410-3), with each set including adjacent conductors that are generally parallel. Although the depicted embodiment includes three sets of third conductors 1410, it will be appreciated that the machine 1400 could be implemented with more or less than this number. Moreover, the number of conductors in each set of third conductors 1410 may vary. For example, in the depicted embodiment one set 1410-1 includes two conductors, another 1410-2 includes three, and another 1410-3 includes four.

With the machine 1400 depicted in FIG. 35, the current in the first and second conductors 1406, 1408 may be controlled to move the second structure within and/or between areas defined by each set of third conductors 1410. It should be noted that only a portion of the conductors are shown for clarity. For example, by controlling the current in the sets of third conductors 1410, the second structure 1404 can be retained within an area defined by that set of third conductors 1410—in effect, an electronic fence, holding pen, or force-field. As a non-limiting example, assume initially all of the conductors 1406, 1408, 1410 have zero current. A second structure, 1404, including one or more magnets have a pole facing the surface formed by the first and the second conductors 1406 and 1408, is located by gravity at the lowest height within the overall system. Next, the first and second conductors 1406 and 1408 are energized and push the second structure 1404 into the lower left portion of third conductor 1410-1 as shown. Next, a current is introduced within 1410-1 such that a force is always pushing against the second structure 1404 such that it remains within the loop defined by the third conductor 1410-1. At this point, the current in the first and second conductors 1406, 1408 can be set to zero, and the second structure 1404 will remain "trapped" within 1410-1. At some future point in time, when it is desired to move the second structure 1404 to within the conductor loop 1410-3, the first and second conductors 1406, 1408 are energized and the currents are dithered in polarity to keep the second structure 1404 roughly in place. Next the current in 1410-1 is set to zero, and then the currents in the first and second conductors 1406, 1408 are used to move the second structure 1404 to the center of 1410-3 (as shown by the dashed line and the direction of its arrow). Like before, once the second structure 1404 is within 1410-3, the current is applied to 1410-3 to act as an electric fence, and then currents within the first and second conductors 1406 and 1408 are set again to zero. This exemplary procedure can continue as shown by the other dashed lines to move 1404 from place to place.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A multi-degree-of-freedom electromagnetic machine that may be operated as a motor, a generator, or a motor-generator, the machine comprising:
   a first structure comprising a first body, a first conductor, a second conductor, and a third conductor, the first body formed of a magnetically permeable material and having an outer surface, at least a portion of the outer surface having a general shape of a surface, the first conductor following a first general trajectory, the second conductor following a second general trajectory that is different from the first general trajectory, the third conductor following a third general trajectory that is different from the first and second general trajectories, the first, second, and third conductors disposed at least adjacent the portion of the outer surface of the first structure and having the general shape of the surface; and
   a second structure disposed adjacent to the first structure and including a magnet that emanates a magnetic field, the magnet having at least one of its magnetic poles facing the surface,
   wherein a Lorentz force affects relative movement between the first structure and the second structure when the magnetic field that emanates from the at least one magnetic pole interacts with electrical currents within any of the electrical conductors.

2. The machine of claim 1, wherein:
   one or more of the first, second, and third conductors comprise a plurality of electrically conductive segments; and
   each of the electrically conductive segments comprises a conductor of predetermined length.

3. The machine of claim 1, wherein one or more of the first, second, and third conductors comprise a contiguous conductor.

4. The machine of claim 1, wherein the surface is one of a closed surface, an open surface, a combination of closed and open surfaces, a planar surface, a non-planar surface, or a combination of planar and non-planar surfaces.

5. The machine of claim 1, wherein the first, second, and third general trajectories are such that the first, second, and third conductors are oriented at predetermined angles relative to each other.

6. The machine of claim 1, wherein the magnetic pole facing the surface is spaced apart from the first structure by a predetermined gap.

7. The machine of claim 1, wherein the magnet is selected from the group consisting of a permanent magnet and an electromagnet.

8. The machine of claim 1, further comprising a device coupled to the second structure.

9. The machine of claim 8, wherein the device is selected from the group consisting of a transducer, electronic circuitry, a storage element, a gyroscopic mass, an electromagnetic reflector, an electromagnetic absorber, a lens, a gas or fluid nozzle, a work tool, a robotic effector, a carrier for transporting animate or inanimate objects, and a motor.

10. The machine of claim 1, further comprising:
a control coupled to the first, second, and third conductors and configured to individually control current magnitudes and directions in each of the first, second, and third conductors to thereby control the relative movement between the first structure and the second structure.

11. The machine of claim 10, further comprising:
an imbalance mass coupled to the second structure,
wherein the control is configured to independently control (i) the current magnitudes and directions in each of the first, second, and third conductors and (ii) frequencies of the currents supplied to each of the first, second, and third conductors to control movement of the second structure.

12. The machine of claim 11, wherein the control is further configured to independently control (i) the current magnitudes and directions in each of the first, second, and third conductors and (ii) frequencies of the currents supplied to each of the first, second, and third to thereby generate and control vibratory haptic feedback.

13. The machine of claim 12, wherein:
the vibratory haptic feedback is generated by causing the second structure to rotate, relative to the first structure, about a first axis and at a rotational speed; and
the vibratory haptic feedback has a magnitude that is controlled by controlling one or more of the rotational speed of the second structure and a tilt angle of the second structure relative to a reference plane.

14. The machine of claim 11, wherein:
the vibratory haptic feedback is generated by causing the second structure to simultaneously oscillate, relative to the first structure, about a first axis and a second axis that is orthogonal to the first axis.

15. The machine of claim 10, further comprising:
a transmitter coupled to one of the first structure or the second structure; and
wherein the control is configured to independently control at least the current magnitudes and directions in each of the first, second, and third conductors to thereby point the transmitter in a first direction.

16. The machine of claim 15, further comprising:
a receiver coupled to one of the first structure or the second structure; and
wherein the control is configured to independently control at least the current magnitudes and directions in each of the first, second, and third conductors to thereby point the receiver in a second direction.

17. The machine of claim 10, further comprising:
a wheel configured to have a vehicle tire mounted thereon, the wheel coupled to the second structure,
wherein the control is configured to independently control at least the current magnitudes and directions in each of the first, second, and third conductors to thereby move the wheel in a desired direction.

18. The machine of claim 10, further comprising:
a pinion gear coupled to the second structure;
an inner shaft coupled to the pinion gear; and
an outer shaft having an inner surface and surrounding at least a portion of the inner shaft, the outer shaft having an annular gear formed on at least a portion of the inner surface, the annular gear meshing with the pinion gear,
wherein the control is configured to independently control
(i) the current magnitudes and directions in each of the first, second, and third conductors and (ii) frequencies of the currents supplied to each of the first, second, and third conductors to thereby control:
(i) a rotational speed of the pinion gear, whereby a rotational speed and direction of the outer shaft is controlled, and
(ii) speed and direction of an orbit of the pinion gear, relative to the annular gear, whereby a rotational speed and direction of the inner shaft is controlled.

19. A multi-degree-of-freedom electromagnetic machine that may be operated as a motor, a generator, or a motor-generator, the machine comprising:
a first structure comprising a first conductor, a second conductor, and a third conductor, the first conductor following a first general trajectory, the second conductor following a second general trajectory that is different from the first general trajectory, the third conductor following a third general trajectory that is different from the first and second general trajectories, the first, second, and third conductors together forming a general shape of a surface;
a second structure disposed adjacent to the first structure and including a magnet that emanates a magnetic field, the magnet having at least one of its magnetic poles facing the surface, the second structure configured to (i) rotate, relative to the first structure, at a rotational speed about a first axis and (ii) rotate, relative to the first structure, to a rotational position about a second axis;
an imbalance mass coupled to the second structure; and
a control coupled to the first, second, and third conductors and configured to independently control (i) current magnitudes and directions in each of the first, second, and third conductors and (ii) frequencies of the currents supplied to each of the first, second, and third conductors, to thereby control movement between the first structure and the second structure,
wherein a Lorentz force affects the relative movement between the first structure and the second structure when the magnetic field that emanates from the at least one magnetic pole interacts with electrical currents within any of the electrical conductors.

20. A multi-degree-of-freedom electromagnetic machine that may be operated as a motor, a generator, or a motor-generator, the machine comprising:
a first structure comprising a first conductor, a second conductor, and a third conductor, the first conductor following a first general trajectory, the second conductor following a second general trajectory that is different from the first general trajectory, the third conductor following a third general trajectory that is different from the first and second general trajectories, the first, second, and third conductors together forming a general shape of a surface;

a second structure disposed adjacent to the first structure and including a magnet that emanates a magnetic field, the magnet having at least one of its magnetic poles facing the surface, the second structure configured to (i) rotate, relative to the first structure, at a rotational speed about a first axis and (ii) rotate, relative to the first structure, to a rotational position about a second axis; and a control coupled to the first, second, and third conductors and configured to independently control (i) current magnitudes and directions in each of the first, second, and third conductors and (ii) frequencies of the currents supplied to each of the first, second, and third conductors, to thereby control the rotational speed and the rotational position of the second structure, wherein a Lorentz force affects the relative movement between the first structure and the second structure when the magnetic field that emanates from the at least one magnetic pole interacts with electrical currents within any of the electrical conductors.

* * * * *